(12) United States Patent
Blue et al.

(10) Patent No.: US 9,777,222 B2
(45) Date of Patent: Oct. 3, 2017

(54) RADIO FREQUENCY HYDROCARBON RESOURCE UPGRADING APPARATUS INCLUDING PARALLEL PATHS AND RELATED METHODS

(71) Applicant: HARRIS CORPORATION, Melbourne, FL (US)

(72) Inventors: Mark Ernest Blue, Palm Bay, FL (US); Lisa Patton Zastrow, Wausau, WI (US); Ryan Matthew Whitney, Indialantic, FL (US); Ronald Edward Jackson, Jr., West Melbourne, FL (US); John Anton Meyer, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 326 days.

(21) Appl. No.: 14/726,751

(22) Filed: Jun. 1, 2015

(65) Prior Publication Data

US 2015/0259604 A1     Sep. 17, 2015

Related U.S. Application Data

(63) Continuation of application No. 13/548,853, filed on Jul. 13, 2012, now Pat. No. 9,044,731.

(51) Int. Cl.
*C10G 1/00* (2006.01)
*B01J 19/12* (2006.01)
(Continued)

(52) U.S. Cl.
CPC .............. *C10G 1/00* (2013.01); *B01J 19/129* (2013.01); *C10G 32/02* (2013.01);
(Continued)

(58) Field of Classification Search
CPC ... E21B 43/2401; E21B 43/2408; C10G 1/00; C10G 1/002
(Continued)

(56) References Cited

U.S. PATENT DOCUMENTS

| 4,279,722 A | 7/1981 | Kirkbride |
|---|---|---|
| 5,055,180 A | 10/1991 | Klaila |

(Continued)

OTHER PUBLICATIONS

Kovaleva et al., "Destruction of Water-in-Oil Emulsions in Radio-Frequency and Microwave Electromagnetic Fields", Energy & Fuels, 2011, pp. 3731-3738, *** See Priority U.S. Appl. 13/648,853, filed Jul. 13, 2012.

*Primary Examiner* — Kenneth L Thompson
*Assistant Examiner* — Steven MacDonald
(74) *Attorney, Agent, or Firm* — Allen, Dyer, Doppelt + Gilchrist, P.A.

(57) ABSTRACT

A radio frequency (RF) hydrocarbon resource upgrading device may include a first hydrocarbon resource upgrading path that may include a plurality of first RF power applicator stages coupled in series. Each first RF power stage is configured to apply RF power to upgrade a hydrocarbon resource passing therethrough. The RF hydrocarbon resource upgrading device may also include a second hydrocarbon resource upgrading path that may include at least one second RF power applicator stage coupled in parallel with at least one of the first RF power applicator stages. The second RF power applicator stage is configured to apply RF power to upgrade the hydrocarbon resource passing therethrough.

21 Claims, 19 Drawing Sheets

(51) Int. Cl.
*C10G 32/02* (2006.01)
*E21B 43/24* (2006.01)

(52) U.S. Cl.
CPC ...... *E21B 43/2401* (2013.01); *E21B 43/2408* (2013.01); *B01J 2219/0004* (2013.01); *B01J 2219/0871* (2013.01); *B01J 2219/0879* (2013.01); *B01J 2219/1203* (2013.01); *C10G 2300/302* (2013.01)

(58) Field of Classification Search
USPC ......... 166/265, 267, 302, 75.12, 272.3, 248; 422/186, 186.29; 204/172, 158.21; 208/46, 106, 132, 429
See application file for complete search history.

(56) References Cited

U.S. PATENT DOCUMENTS

| | | | |
|---|---|---|---|
| 5,181,998 A | 1/1993 | Murphy et al. | |
| 6,142,707 A | 11/2000 | Bass et al. | |
| 7,891,421 B2 | 2/2011 | Kasevich | |
| 2006/0180304 A1 | 8/2006 | Kasevich | |
| 2006/0283598 A1 | 12/2006 | Kasevich | |
| 2008/0190818 A1 | 8/2008 | Dana et al. | |
| 2009/0038932 A1 | 2/2009 | Denslow et al. | |
| 2009/0242196 A1 | 10/2009 | Pao | |
| 2009/0283257 A1 | 11/2009 | Becker | |
| 2010/0078163 A1 | 4/2010 | Banerjee et al. | |
| 2010/0212893 A1 | 8/2010 | Moini Araghi et al. | |
| 2010/0219105 A1 | 9/2010 | White et al. | |
| 2010/0294488 A1 | 11/2010 | Wheeler et al. | |
| 2010/0294489 A1 | 11/2010 | Dreher, Jr. et al. | |
| 2010/0294490 A1 | 11/2010 | Banerjee et al. | |
| 2011/0049016 A1 | 3/2011 | McGrady et al. | |
| 2011/0049133 A1 | 3/2011 | Przybyla | |
| 2011/0094738 A1 | 4/2011 | Safinya | |
| 2011/0253367 A1 | 10/2011 | Banerjee et al. | |
| 2011/0294223 A1 | 12/2011 | Safinya et al. | |
| 2011/0309988 A1 | 12/2011 | Parsche | |
| 2012/0012575 A1 | 1/2012 | Parsche | |
| 2012/0067572 A1 | 3/2012 | Trautman et al. | |
| 2012/0073810 A1 | 3/2012 | Macadam et al. | |
| 2012/0085533 A1 | 4/2012 | Madison et al. | |
| 2012/0090844 A1 | 4/2012 | Madison et al. | |
| 2014/0014316 A1 | 1/2014 | Blue et al. | |
| 2014/0014324 A1 | 1/2014 | Wright et al. | |
| 2014/0014325 A1 | 1/2014 | Blue et al. | |
| 2014/0014326 A1 | 1/2014 | Blue et al. | |

RADIO FREQUENCY HYDROCARBON RESOURCE UPGRADING APPARATUS INCLUDING PARALLEL PATHS AND RELATED METHODS

FIELD OF THE INVENTION

The present invention relates to the field of hydrocarbon resource processing, and, more particularly, to hydrocarbon resource processing methods using radio frequency application and related devices.

BACKGROUND OF THE INVENTION

Energy consumption worldwide is generally increasing, and conventional hydrocarbon resources are being consumed. In an attempt to meet demand, the exploitation of unconventional resources may be desired. For example, highly viscous hydrocarbon resources, such as heavy oils, may be trapped in sands where their viscous nature does not permit conventional oil well production. This category of hydrocarbon resource is generally referred to as oil sands. Estimates are that trillions of barrels of oil reserves may be found in such oil sand formations.

In some instances, these oil sand deposits are currently extracted via open-pit mining. Another approach for in situ extraction for deeper deposits is known as Steam-Assisted Gravity Drainage (SAGD). The heavy oil is immobile at reservoir temperatures, and therefore, the oil is typically heated to reduce its viscosity and mobilize the oil flow. In SAGD, pairs of injector and producer wells are formed to be laterally extending in the ground. Each pair of injector/producer wells includes a lower producer well and an upper injector well. The injector/production wells are typically located in the payzone of the subterranean formation between an underburden layer and an overburden layer.

The upper injector well is used to typically inject steam, and the lower producer well collects the heated crude oil or bitumen that flows out of the formation, along with any water from the condensation of injected steam. The injected steam forms a steam chamber that expands vertically and horizontally in the formation. The heat from the steam reduces the viscosity of the heavy crude oil or bitumen, which allows it to flow down into the lower producer well where it is collected and recovered. The steam and gases rise due to their lower density. Gases, such as methane, carbon dioxide, and hydrogen sulfide, for example, may tend to rise in the steam chamber and fill the void space left by the oil defining an insulating layer above the steam. Oil and water flow is by gravity driven drainage urged into the lower producer well.

Many countries in the world have large deposits of oil sands, including the United States, Russia, and various countries in the Middle East. Oil sands may represent as much as two-thirds of the world's total petroleum resource, with at least 1.7 trillion barrels in the Canadian Athabasca Oil Sands, for example. At the present time, only Canada has a large-scale commercial oil sands industry, though a small amount of oil from oil sands is also produced in Venezuela. Because of increasing oil sands production, Canada has become the largest single supplier of oil and products to the United States. Oil sands now are the source of almost half of Canada's oil production, while Venezuelan production has been declining in recent years. Oil is not yet produced from oil sands on a significant level in other countries.

U.S. Published Patent Application No. 2010/0078163 to Banerjee et al. discloses a hydrocarbon recovery process whereby three wells are provided: an uppermost well used to inject water, a middle well used to introduce microwaves into the reservoir, and a lowermost well for production. A microwave generator generates microwaves which are directed into a zone above the middle well through a series of waveguides. The frequency of the microwaves is at a frequency substantially equivalent to the resonant frequency of the water so that the water is heated.

Along these lines, U.S. Published Patent Application No. 2010/0294489 to Dreher, Jr. et al. discloses using microwaves to provide heating. An activator is injected below the surface and is heated by the microwaves, and the activator then heats the heavy oil in the production well. U.S. Published Patent Application No. 2010/0294488 to Wheeler et al. discloses a similar approach.

U.S. Pat. No. 7,441,597 to Kasevich discloses using a radio frequency generator to apply radio frequency (RF) energy to a horizontal portion of an RF well positioned above a horizontal portion of an oil/gas producing well. The viscosity of the oil is reduced as a result of the RF energy, which causes the oil to drain due to gravity. The oil is recovered through the oil/gas producing well.

U.S. Pat. No. 7,891,421, also to Kasevich, discloses a choke assembly coupled to an outer conductor of a coaxial cable in a horizontal portion of a well. The inner conductor of the coaxial cable is coupled to a contact ring. An insulator is between the choke assembly and the contact ring. The coaxial cable is coupled to an RF source to apply RF energy to the horizontal portion of the well.

U.S. Patent Application Publication No. 2011/0309988 to Parsche discloses a continuous dipole antenna. More particularly, the patent application discloses a shielded coaxial feed coupled to an AC source and a producer well pipe via feed lines. A non-conductive magnetic bead is positioned around the well pipe between the connection from the feed lines.

U.S. Patent Application Publication No. 2012/0085533 to Madison et al. discloses combining cyclic steam stimulation with RF heating to recover hydrocarbons from a well. Steam is injected into a well followed by a soaking period wherein heat from the steam transfers to the hydrocarbon resources. After the soaking period, the hydrocarbon resources are collected, and when production levels drop off, the condensed steam is revaporized with RF radiation to thus upgrade the hydrocarbon resources.

Unfortunately, long production times, for example, due to a failed start-up, to extract oil using SAGD may lead to significant heat loss to the adjacent soil, excessive consumption of steam, and a high cost for recovery. Significant water resources are also typically used to recover oil using SAGD, which may impact the environment. Limited water resources may also limit oil recovery. SAGD is also not an available process in permafrost regions, for example, or in areas that may lack sufficient cap rock, are considered "thin" payzones, or payzones that have interstitial layers of shale.

Additionally, production times and efficiency may be limited by post extraction processing of the recovered oil. More particularly, oil recovered may have a chemical composition or have physical traits that may require additional or further post extraction processing as compared to other types of oil recovered.

SUMMARY OF THE INVENTION

In view of the foregoing background, it is therefore an object of the present invention to efficiently upgrade a hydrocarbon resource.

This and other objects, features, and advantages in accordance with the present invention are provided by a radio frequency (RF) hydrocarbon resource upgrading apparatus that includes a first hydrocarbon resource upgrading path that includes a plurality of first RF power applicator stages coupled in series. Each first RF power stage is configured to apply RF power to upgrade a hydrocarbon resource passing therethrough. The apparatus also includes a second hydrocarbon resource upgrading path that includes at least one second RF power applicator stage coupled in parallel with at least one of the first RF power applicator stages. The second RF power applicator stage is configured to apply RF power to upgrade a hydrocarbon resource passing therethrough. Accordingly, the RF hydrocarbon resource upgrading apparatus upgrades the hydrocarbon resource passing through multiple hydrocarbon resource upgrading paths. This may be particularly advantageous for efficiently upgrading the hydrocarbon resource according to different operating parameters to output one or more upgraded hydrocarbon resource products with different desired characteristics, for example.

Each successive one of the plurality of first RF power applicator stages may reduce a viscosity of the hydrocarbon resource passing therethrough. The at least one second RF power applicator stage may also reduce a viscosity of the hydrocarbon resource passing therethrough.

The hydrocarbon resource processing apparatus may further include a common input coupled to the first and second hydrocarbon resource upgrading paths. The common input may be configured to receive bitumen, for example.

The hydrocarbon resource processing apparatus may further include respective first and second outputs coupled to the first and second hydrocarbon resource upgrading paths. The plurality of first RF power applicator stages may each have at least one different operating parameter than each other, for example.

The at least one second RF power applicator stage may have at least one different operating parameter than the plurality of first RF power applicator stages. The first hydrocarbon resource upgrading path may include a plurality of first product taps associated with the plurality of first RF power stages.

The second hydrocarbon resource upgrading path may include a plurality of second product taps associated with the at least one second RF power stage, for example.

A method aspect is directed to a method of radio frequency (RF) upgrading a hydrocarbon resource. The method includes passing a portion of the hydrocarbon resource through a first hydrocarbon resource upgrading path that includes a plurality of first RF power applicator stages coupled in series. Each first RF power stage applies RF power to upgrade the hydrocarbon resource passing therethrough. The method also includes passing another portion of the hydrocarbon resource through a second hydrocarbon resource upgrading path that includes at least one second RF power applicator stage coupled in parallel with at least one of the first RF power applicator stages. The second RF power applicator stage applies RF power to upgrade the hydrocarbon resource passing therethrough.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
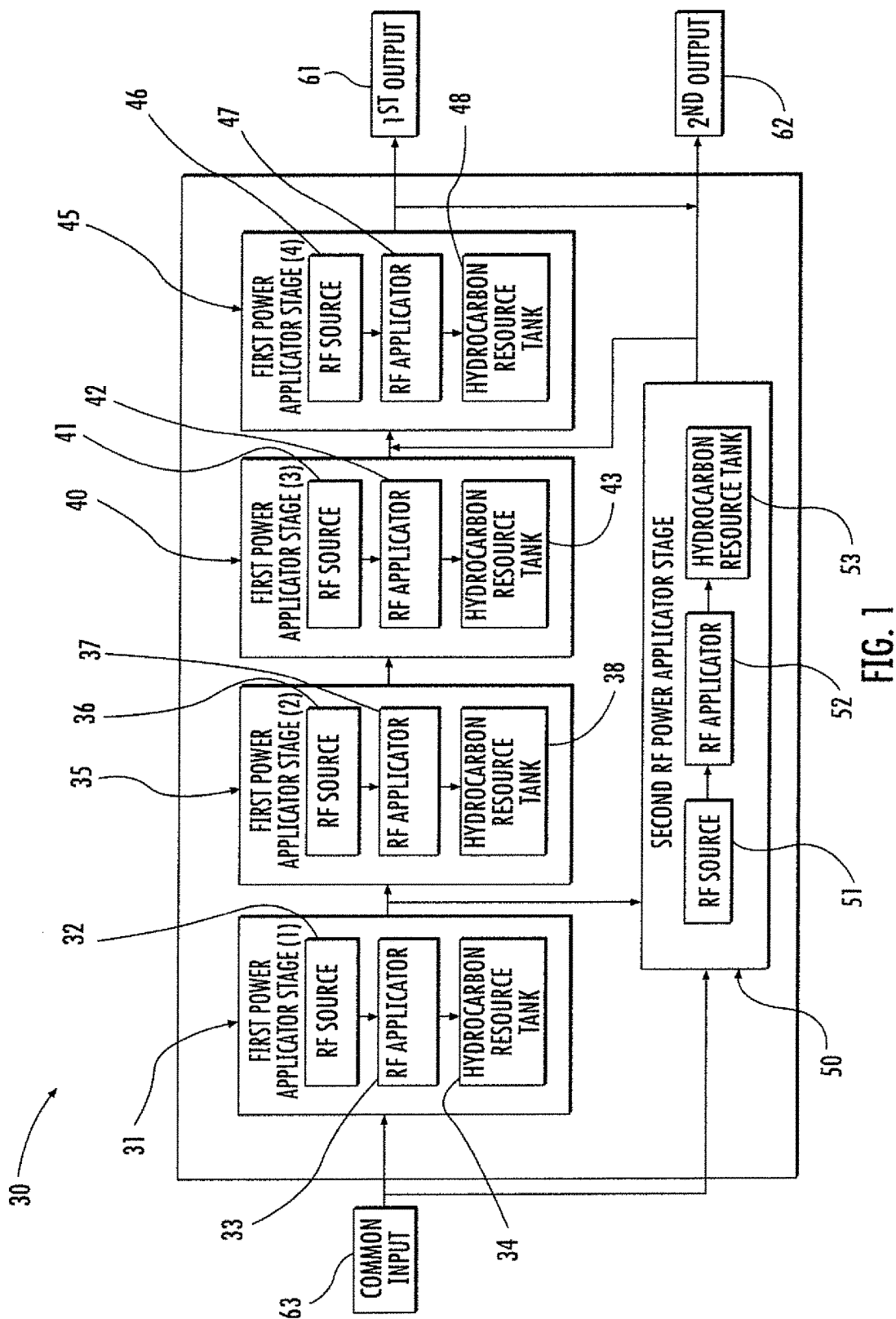
FIG. 1 is a schematic diagram of an RF hydrocarbon resource upgrading apparatus in accordance with the present invention.
Figure 2:
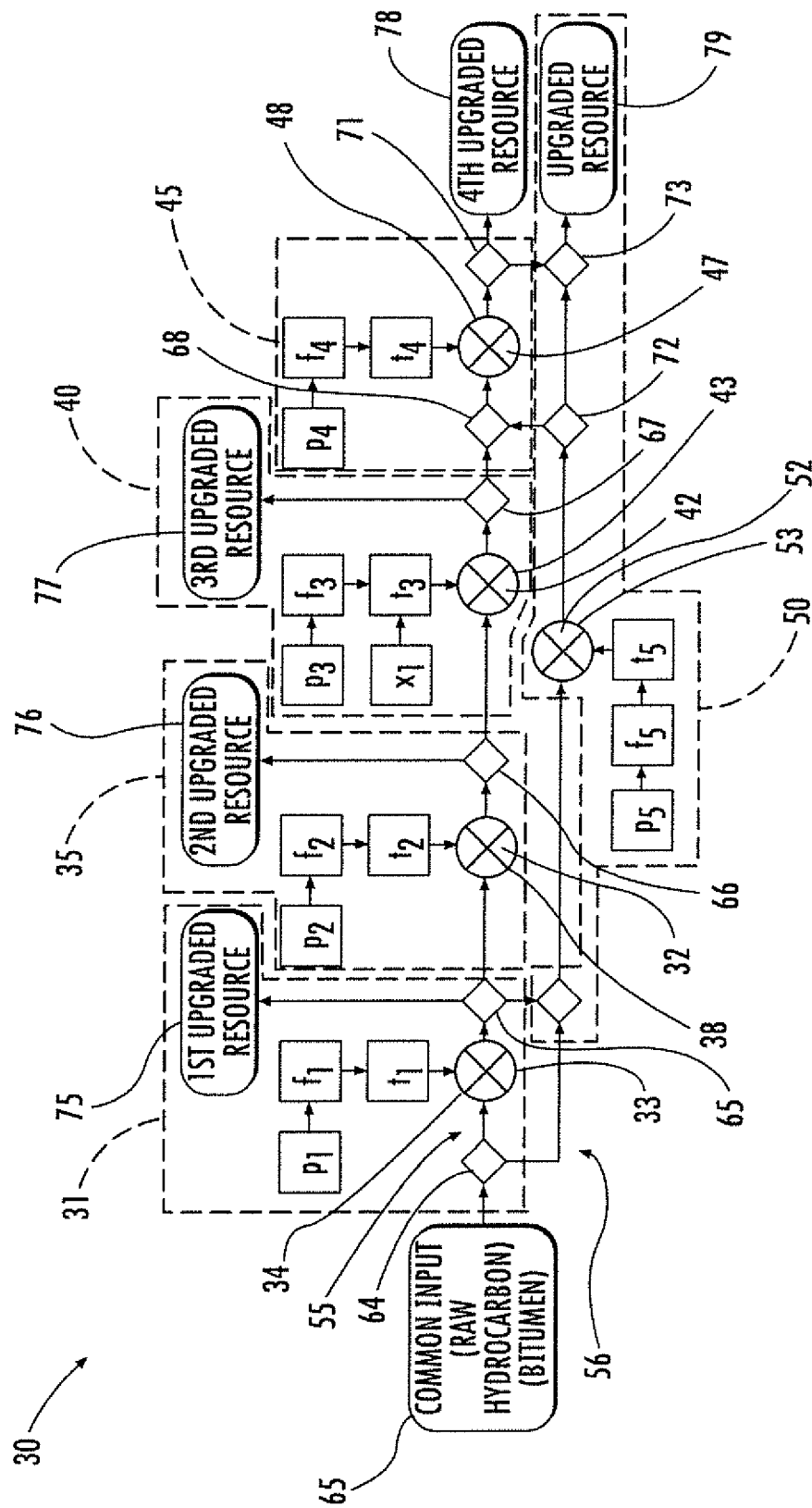
FIG. 2 is a schematic block diagram of a portion of the RF hydrocarbon resource upgrading apparatus of FIG. 1.
Figure 3:
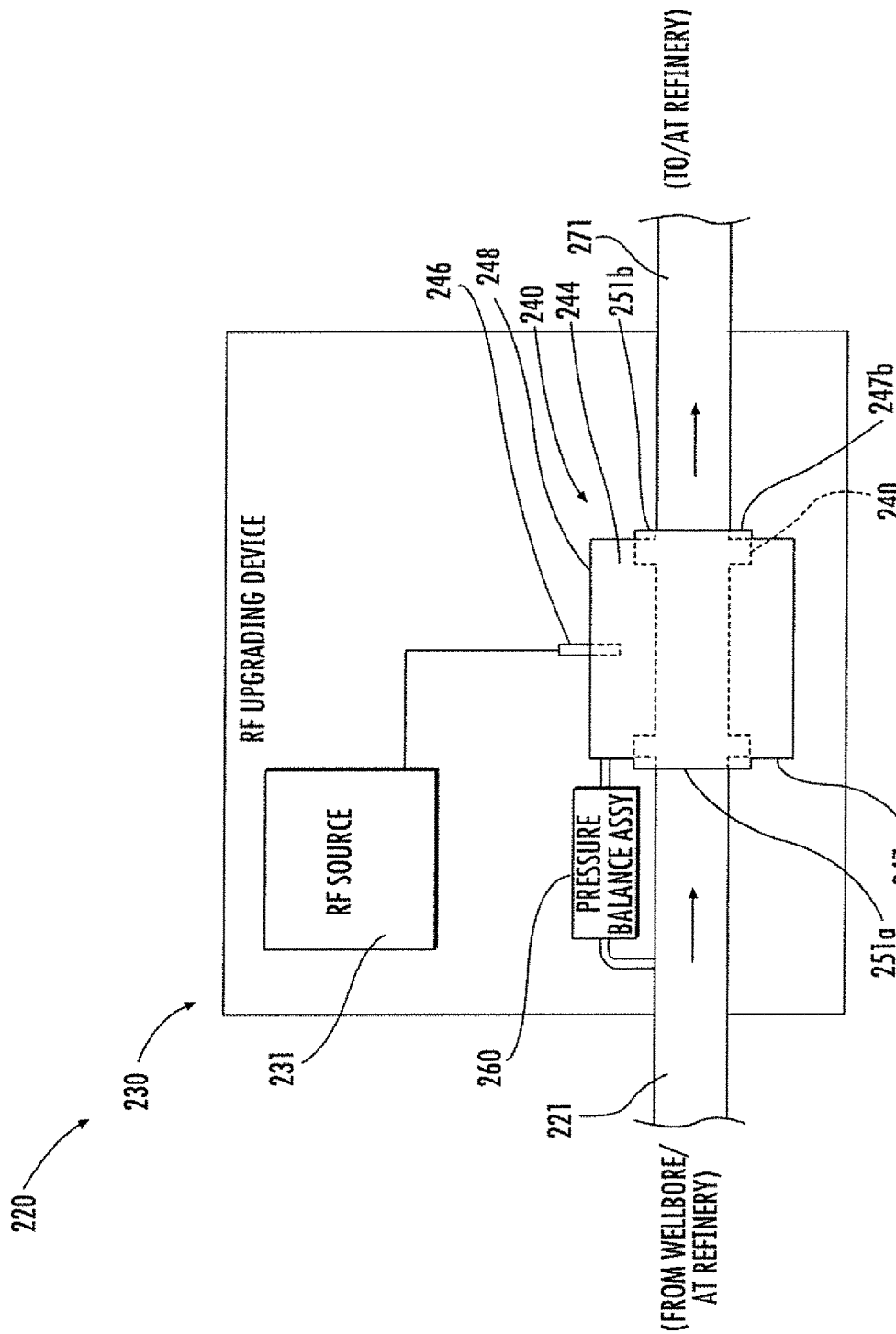
FIG. 3 is a schematic diagram of an apparatus for transporting and upgrading a hydrocarbon resource according to the present invention.
Figure 4:
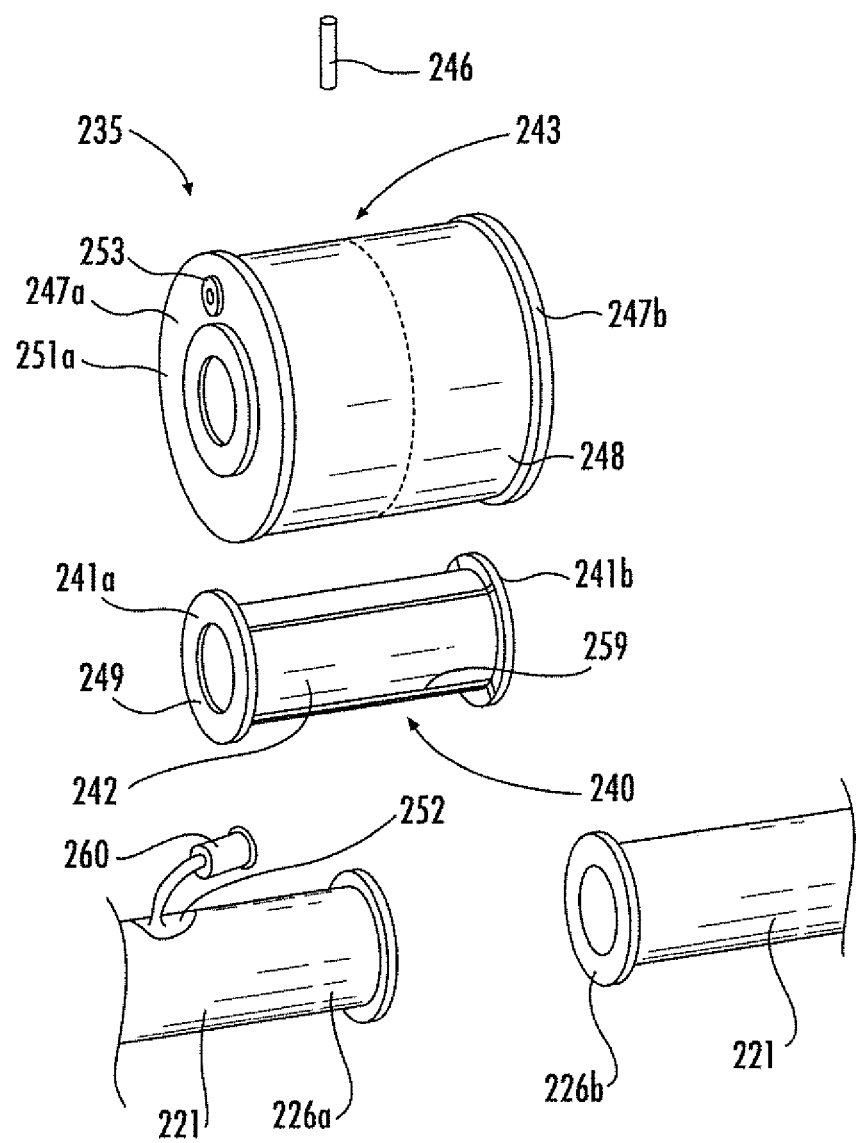
FIG. 4 is an exploded perspective view of the RF applicator of FIG. 3.
Figure 5:
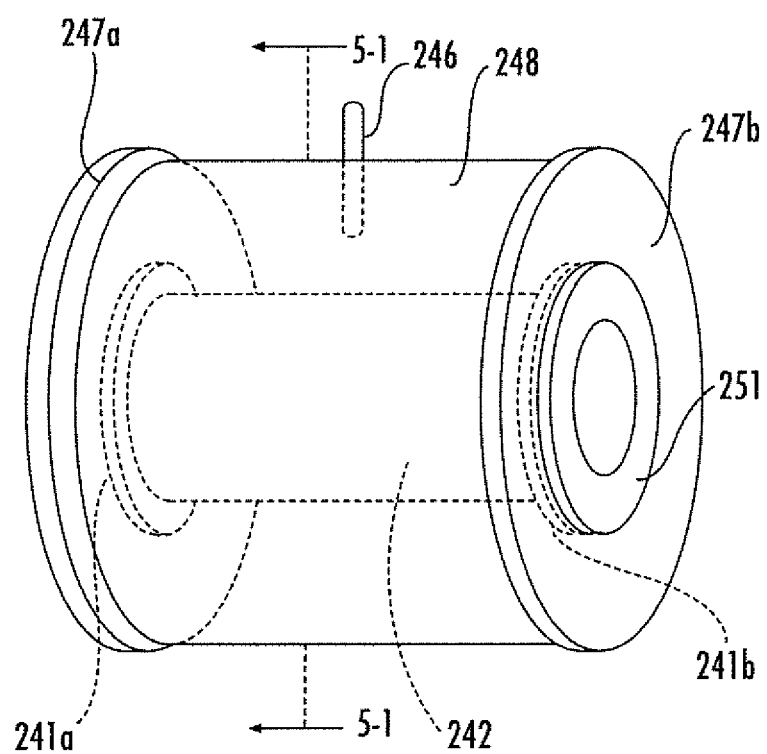
FIG. 5 is a perspective view of a portion of the RF applicator of FIG. 4.
Figure 6:
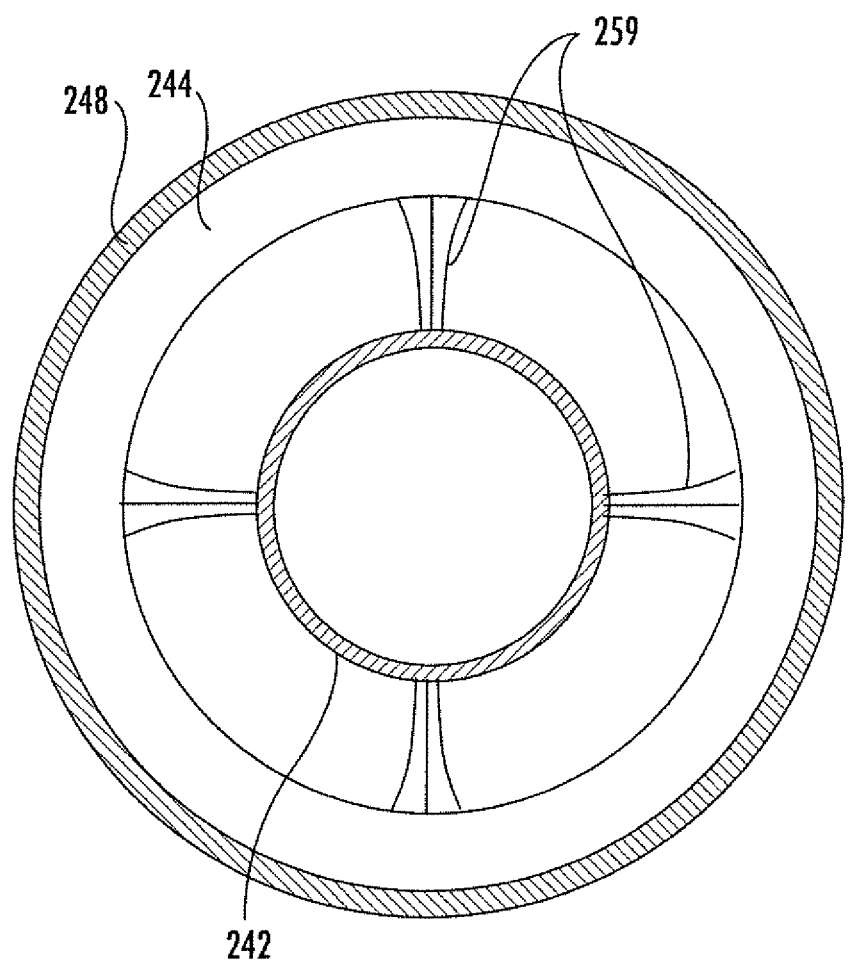
FIG. 6 is a cross-sectional view of the portion of the RF applicator of FIG. 5 taken along line 6-1.

Referring to FIGS. 1-2, a radio frequency (RF) hydrocarbon resource upgrading system 20 according to an embodiment is illustrated. The hydrocarbon resource processing system 20 includes an RF hydrocarbon resource upgrading apparatus 30. The apparatus 30 may be coupled to a head of one or more wellbores extending within the subterranean formation.

The RF hydrocarbon resource upgrading apparatus 30 includes a first hydrocarbon resource upgrading path 55 that includes first RF power applicator stages 31, 35, 40, 45 coupled in series. Each first RF power stage is configured to apply RF power to upgrade the hydrocarbon resource passing therethrough. A first output 61 is coupled to the first hydrocarbon resource upgrading path 55.

The RF hydrocarbon resource upgrading apparatus 30 also includes a second hydrocarbon resource upgrading path 56 that includes a second RF power applicator stage 50 coupled in parallel with the first RF power applicator stages. The second RF power applicator stage 50 is also configured to apply RF power to upgrade the hydrocarbon resource passing therethrough. A second output 62 is coupled to the second hydrocarbon resource upgrading path 56. The first and second RF power applicator stages are coupled to a common input 63 or hydrocarbon resource source, for example, at a wellhead or at a remote refinery. A tap 64 associated with the common input may control passage of the hydrocarbon resource to one or both of the first and second hydrocarbon resource upgrading paths 55, 56. Further details of the first and second RF power applicator stages are described below.

The first RF power applicator stages included along the first hydrocarbon resource upgrading path 55 include four hydrocarbon processing stages 31, 35, 40, 45. A first hydrocarbon resource processing stage 31 includes an RF source 32 and an RF applicator 33 coupled to the RF source. The first hydrocarbon resource processing stage 30 also includes a hydrocarbon resource storage tank 34, which may be located adjacent the head 22 of the wellbore 23 in some embodiments. The RF applicator 33 may be carried within or be adjacent the hydrocarbon resource storage tank 34 so that RF power is applied to the hydrocarbon resources carried therewithin. In some embodiments, a hydrocarbon resource storage tank may not be used, and instead, the hydrocarbon resources may be passed through a desired length of piping.

At the first hydrocarbon resource processing stage 31, raw hydrocarbon resources from a common input 63, for example, bitumen, that are produced from the wellbores are RF processed or upgraded by being placed into a relatively high intensity electromagnetic field generated from the RF source 32 and applied via the RF applicator 33. The RF power is applied according to a set of operating parameters, and, more particularly, at a specific frequency $f_1$, duration $t_1$, and power level $p_1$ to obtain a desired temperature. For example, to process bitumen so that the byproduct of the RF processing are alkalines, 150 watts of RF power ($p_1$) may be applied at the frequency of 27 MHz ($f_1$) for about 90 minutes ($t_1$). After the application of RF power for the desired duration, the first hydrocarbon resource processing stage outputs a first upgraded hydrocarbon resource 75 via an associated tap 65. The first upgraded hydrocarbon resource 75 may be distilled, if desired, or removed from the apparatus as a final product, for example.

However, if further upgrading is desired, the first upgraded hydrocarbon resource 75 is provided, via the tap 65, to a second hydrocarbon resource processing stage 35 included along the first hydrocarbon resource upgrading path 55. The second hydrocarbon resource processing stage 35 is coupled in series with the first hydrocarbon resource processing stage 31. Similar to the first hydrocarbon resource processing stage 31, the second hydrocarbon resource processing stage 35 also includes an RF source 36, an RF applicator 37 coupled to the RF source, and a hydrocarbon resource storage tank 38.

At the second hydrocarbon resource processing stage 35, the remaining bitumen from the first upgraded hydrocarbon resource 75 is serially processed for further upgrading (i.e., viscosity reduction) by applying RF power to the first upgraded hydrocarbon resources. The RF power is generated from the RF source 36 and applied via the RF applicator 37. The RF power applied at the second hydrocarbon resource processing stage 35 is also applied according to a set of operating parameters which may include a specific frequency $f_2$, duration $t_2$, and power level $p_2$ to obtain a desired temperature. For example, to process the alkalines so that the byproduct of the RF processing at the second hydrocarbon resource processing stage 35 is toluene, 200 watts of RF power ($p_2$) may be applied at the frequency of 30 MHz ($f_2$) for about 20 minutes ($t_2$). After the application of RF power for the desired duration, the second hydrocarbon resource processing stage 35 outputs a second upgraded hydrocarbon resource 76 via an associated tap 66. The second upgraded hydrocarbon resource 76 may be distilled or removed from the apparatus as a final product, for example.

If further upgrading is desired, the second upgraded hydrocarbon resource 76 is provided, via the tap 66, to a third hydrocarbon resource processing stage 40 coupled in series with the first and second hydrocarbon resource processing stages 31, 35. Similar to the first and second hydrocarbon resource processing stages 31, 35, the third hydrocarbon resource processing stage 40 also includes an RF source 41, an RF applicator 42 coupled to the RF source, and a hydrocarbon resource storage tank 43.

At the third hydrocarbon resource processing stage 40, the second upgraded hydrocarbon resource 76 is serially processed for further upgrading by applying RF power to the second upgraded hydrocarbon resources 76. The RF power is generated from the RF source 41 and applied via the RF applicator 42. The RF power applied at the third hydrocarbon resource processing stage 40 is also applied according to operating parameters which includes a specific frequency $f_3$, duration $t_3$, and power level $p_3$ to obtain a desired temperature. The operating parameters may be different than the operating parameters for either or both of the first and second hydrocarbon processing stages 31, 35. For example, to process the toluene so that the byproduct of the RF processing at the third hydrocarbon resource processing stage 40 is methyl cyclohexane, 130 watts of RF power $p_3$ may be applied at the frequency of 30 MHz ($f_3$) for about 30 minutes ($t_3$). Moreover, to aid in further upgrading or reducing the viscosity of the second upgraded hydrocarbon resource 76, a solvent or carrier gas $x_1$ such as steam, $N_2$, or $H_2$ may be added during application of the RF power. For example, to obtain methyl cyclohexane, $H_2$ ($x_1$) may be added to facilitate upgrading.

After the application of RF power for the desired duration, the third hydrocarbon resource processing stage 40 outputs a third upgraded hydrocarbon resource 77 via the tap 67. The third upgraded hydrocarbon resource 77 may be distilled or removed from the apparatus as a final product, for example. A further tap 68 may be coupled is illustratively coupled in series with the tap 67. The further tap 68 may be operated to selectively receive an upgraded hydrocarbon resource processed from the second RF applicator stage 50 along the second hydrocarbon resource upgrading path 56 to combine with the third upgraded hydrocarbon resource 77. Further details of the second RF power applicator stage 50 will be described below.

Still, if further upgrading is desired, the third upgraded hydrocarbon resource is provided to a fourth hydrocarbon resource processing stage 45, via the taps 67, 68. The fourth hydrocarbon resource processing stage 45 is coupled in series with the first, second, and third hydrocarbon resource processing stages 31, 35, 40. Similar to the first, second, and third, hydrocarbon resource processing stages 31, 35, 40, the fourth hydrocarbon resource processing stage 45 also includes an RF source 46, an RF applicator 47 coupled to the RF source, and a hydrocarbon resource storage tank 48 also located adjacent the head 22 of the wellbore 23.

At the fourth hydrocarbon resource processing stage 45, the third upgraded hydrocarbon resource is serially processed for further upgrading or viscosity reducing by applying RF power to the third upgraded hydrocarbon resource 77 according to another set of operating parameters, which may be different than the operating parameters for any of the first, second, and third hydrocarbon resource processing stages 31, 35, 40. The RF power is generated from the RF source 46 and applied via the RF applicator 47. The RF power applied at the fourth hydrocarbon resource processing stage 40 is also applied at a specific frequency $f_4$, duration $t_4$, and power level $p_4$ to obtain a desired temperature. For example, to process the methyl cyclohexane so that the byproduct of the RF processing at the fourth hydrocarbon resource processing stage 45 is methane, 100 watts of RF power ($p_4$) may be applied at the frequency of 54 MHz ($f_4$) for about 75 minutes ($t_4$). After the application of RF power for the desired duration, the fourth hydrocarbon resource processing stage 45 outputs a fourth upgraded hydrocarbon resource 78 via the tap 71 at the first output 61. The fourth upgraded hydrocarbon resource 78 may be distilled or removed from the apparatus as a final product, for example.

Any number of serially coupled first RF power applicator stages may be used to achieve an upgraded hydrocarbon resource product having desired characteristics. Additionally, RF power may be applied at different frequencies, durations, and power levels to achieve those desired characteristics. And the power level will vary based on the quantity of resources being processed.

A fifth hydrocarbon resource processing stage 50 that is coupled in parallel with the first RF power applicator stages 31, 35, 40, 45 defines the second RF power applicator stage. The fifth hydrocarbon resource processing stage 50 also includes an RF source 51, an RF applicator 52 coupled to the RF source, and a hydrocarbon resource storage tank 53. The fifth hydrocarbon resource processing stage 50 may be particularly advantageous for producing an upgraded hydrocarbon resource having a relatively low viscosity, for example, low viscosity bitumen.

The fifth hydrocarbon resource processing stage 50 selectively processes or upgrades the raw hydrocarbon resources received from the tap 64 and/or the tap 65 associated with the first upgraded hydrocarbon resource 75 output from the first hydrocarbon resource processing stage 31 by application of RF power. The RF power is generated from the RF source 51 and applied via the RF applicator 52. The RF power applied at the fifth hydrocarbon resource processing stage 50 is also applied based upon certain operating parameters, and, more particularly, at a specific frequency $f_5$, duration $t_5$, and power level $p_5$ to obtain a desired temperature. For example, to process the raw hydrocarbon resources and the first upgraded hydrocarbon resources 75 so that the byproduct of the RF processing at the bypass stage is low viscosity bitumen, 50 kilowatts of RF power ($p_5$) may be applied at the frequency of 6 MHz ($f_5$) for about 30 days ($t_5$).

After the application of RF power for the desired duration, the fifth hydrocarbon resource processing stage 50 outputs an upgraded hydrocarbon resource 79 that may be provided to the first hydrocarbon resource upgrading path 55 via the taps 68, 72 or may be combined with the fourth upgraded hydrocarbon resource 78 via the taps 71, 73 to form the upgraded hydrocarbon resource, e.g., low viscosity bitumen, at the second output 62. The upgraded hydrocarbon resource 79 may be distilled or removed from the apparatus 30 as a final product, for example.

Additional second RF power applicator stages may be included along the second hydrocarbon resource upgrading path to achieve desired physical properties of the raw hydrocarbon resource. Moreover, the above-noted processes are implemented at relatively low temperatures, for example, temperatures below 200° C. This advantageously may increase efficiency and reduce costs, for example.

A method aspect is directed to a method of radio frequency (RF) upgrading a hydrocarbon resource. The method includes passing the hydrocarbon resource through a first hydrocarbon resource upgrading path 55 that includes a plurality of first RF power applicator stages 31, 35, 40, 45 coupled in series. Each first RF power stage 31, 35, 40, 45 applies RF power to upgrade a hydrocarbon resource passing therethrough. The method also includes passing the hydrocarbon resource through a second hydrocarbon resource upgrading path 56 that includes at least one second RF power applicator stage 50 coupled in parallel with at least one of the first RF power applicator stages 31, 35, 40, 45. The second RF power applicator stage 50 applies RF power to upgrade a hydrocarbon resource passing therethrough.

Referring now to FIG. 3-6, an embodiment of a hydrocarbon resource processing apparatus 220 for transporting and upgrading a hydrocarbon resource, for example, is illustrated. The illustrated hydrocarbon resource apparatus 220 may be included in a section of pipeline, for example, near or at a refinery, or adjacent a wellhead. Of course the apparatus 220, may be positioned elsewhere and may be associated with other components extending from the wellhead through the refinery. The hydrocarbon resource processing apparatus 220 may be tuned to a desired RF frequency or frequency range and a desired power level to achieve an upgraded hydrocarbon resource, as will be appreciated by those skilled in the art, and as described in further detail below.

The apparatus 220 for transporting and upgrading a hydrocarbon resource includes pipeline segments 221 coupled together in end-to-end relation to transport the hydrocarbon resources therethrough. The pipeline segments 221 may include metal, for example, so that they are electrically conductive. The pipeline segments 221 may carry crude oil, gasoline, or other hydrocarbon resources therethrough, for example. More particularly, the pipeline segments 221 may carry hydrocarbon resources from a wellhead, or may be adjacent another hydrocarbon processing facility, for example.

The apparatus for transporting and upgrading a hydrocarbon resource 220 also includes a radio frequency (RF) upgrading device 230 that includes an RF source 231. The RF upgrading device 230 also includes an RF applicator 235 between the pair of pipeline segments 221. The RF applicator 235 is configured to heat a hydrocarbon resource flowing through the pair of pipeline segments 221. The RF applicator 235 includes an inner tubular dielectric coupler 240 between adjacent sections of the pipeline sections 21. The inner tubular dielectric coupler 240 may include a pair of end flanges 241a, 241b and a tubular body 242 extending therebetween. The end flanges 241a, 241b couple to respective end flanges 226a, 226b of the pipeline segments 221. The end flanges 241a, 241b of the inner tubular dielectric coupler 240 may include a surface feature 249 that aides in alignment with the pipeline segment 221 and may provide an increased seal when connected. Ribs 259 may extend along the length of the inner tubular dielectric coupler 240 for increased strength. The inner tubular dielectric coupler 240 has a same cross-sectional shape as the adjacent sections of the plurality pipeline segments 221. In other words, the inner diameters of the pipeline segments 221 and the inner tubular dielectric coupler 240 are the same size, for example 48-inches, so that obstruction of the hydrocarbon fluid flow is reduced.

The inner tubular dielectric coupler 240 may be high density polyethylene (HDPE). Of course, the inner tubular dielectric coupler 240 may be another dielectric material.

The RF applicator 235 also includes an electrically conductive outer housing 243 surrounding the inner tubular dielectric coupler 240. Similar to the inner tubular dielectric coupler 240, the electrically conductive outer housing 243 includes a pair of spaced apart end walls 247a, 247b and a tubular body 248 extending therebetween. The electrically conductive outer housing 243 is cylindrical in shape to define an RF cavity 244. The electrically conductive outer housing 243 may also be a two-part housing, for example, it may come apart for increased ease of assembly. The spaced apart end walls 247a, 247b may each include a recess 251a, 251b, with respect to the RF cavity 244, for receiving the end flanges 226a, 226b of the pipeline segments 221 therein. Each recess 251a, 251b may aid in alignment with the pipeline segment 221. Of course, the end walls 247a, 247b may not include a recess, or may include other or additional surface features.

The RF applicator 235 includes an RF feed 246 connected to the RF cavity 44 and the RF source 231. More particularly, the RF feed 246 extends into the RF cavity 244 a distance or length that is matched to the resonant frequency of the RF cavity. The resonant frequency of the RF cavity 244 is based upon the diameter of the electrically conductive outer housing 243. Accordingly, the RF source 231 is configured to apply RF power at a frequency based upon a resonant frequency of the RF cavity 244. The RF power applied the frequency advantageously upgrades the hydrocarbon resource.

The RF source 231 may apply RF power which may be matched to the resonant frequency of the RF cavity 244. Of course, the RF source 231 may apply RF power at another frequency or frequency range. For example, for a flow rate less than 550,000 BPD, the RF source 231 may be configured to apply RF power in a range of 7-8 megawatts, for example, as 1.5 megawatts typically corresponds to a 1° F. temperature increase. It should be understood, however, that the size of the pipeline segments 221 and the RF cavity 244 may be independent of each other.

RF power is applied by the RF source 231 upgrading the hydrocarbon fluid within the pipeline segments 221. More particularly, the hydrocarbon fluid is heated volumetrically, i.e., throughout the cross-section to upgrade it. In other words, the RF applicator 235 cooperates with the RF source 231 to mostly heat the hydrocarbon fluid and not so much of the outside of the pipeline segments 221. Indeed, the pipeline segments 221, which may include metal, block RF energy.

It may be particularly desirable for the RF applicator 235 to be configured to supply a majority of the RF power to the hydrocarbon fluid, reducing the power absorbed by the RF cavity 244 so that wall temperatures, e.g. the tubular body 242 of the inner tubular dielectric coupler 240, may not be excessive.

The apparatus for transporting and upgrading a hydrocarbon resource 220 may further include a pressure balance assembly 260 connected between an adjacent pipeline segment 221 and the electrically conductive outer housing 243. In particular, the pressure balance assembly 260 may be coupled to an opening 252 in the adjacent pipeline segment 221 and an opening 253 in the electrically conductive outer housing 243. The pressure balance assembly 260 may be in the form of the pressure valve, for example, and may be particularly advantageous for pressure irregularities that may occur from pigging operations, for example. Pressure balancing of the cavity may allow for thinner dielectric wall section and less energy lost to the wall.

Indeed, the RF upgrading device may advantageously be installed and operated relatively easily. More particularly, existing pipeline segments may be replaced with the hydrocarbon pipeline segments 221 described herein including the RF applicator 235. More than one RF applicator 235 may be used to obtain a desired temperature profile along the length of the pipeline segments 221. The RF upgrading device 230 including the RF source 231 may also be controlled electronically. More particularly, in some embodiments, the RF upgrading device 230 may be monitored remotely, and the RF source 231 may also be controlled remotely. For example, depending on the type of hydrocarbon resource carried within the pipeline segments 221, it may be desirable to change the frequency, or it may be desirable to turn off the RF source 231 when a pig passes.

A method aspect is directed to a method for transporting and upgrading a hydrocarbon resource. The method includes passing the hydrocarbon resource through a pair of pipeline segments 221 with an inner tubular dielectric coupler 240 therebetween, and with an electrically conductive outer housing 243 surrounding the inner tubular dielectric coupler. The method further includes driving the electrically conductive outer housing 243 with an RF source 231 at an operating frequency and power to upgrade the hydrocarbon resource.

Figure 7:
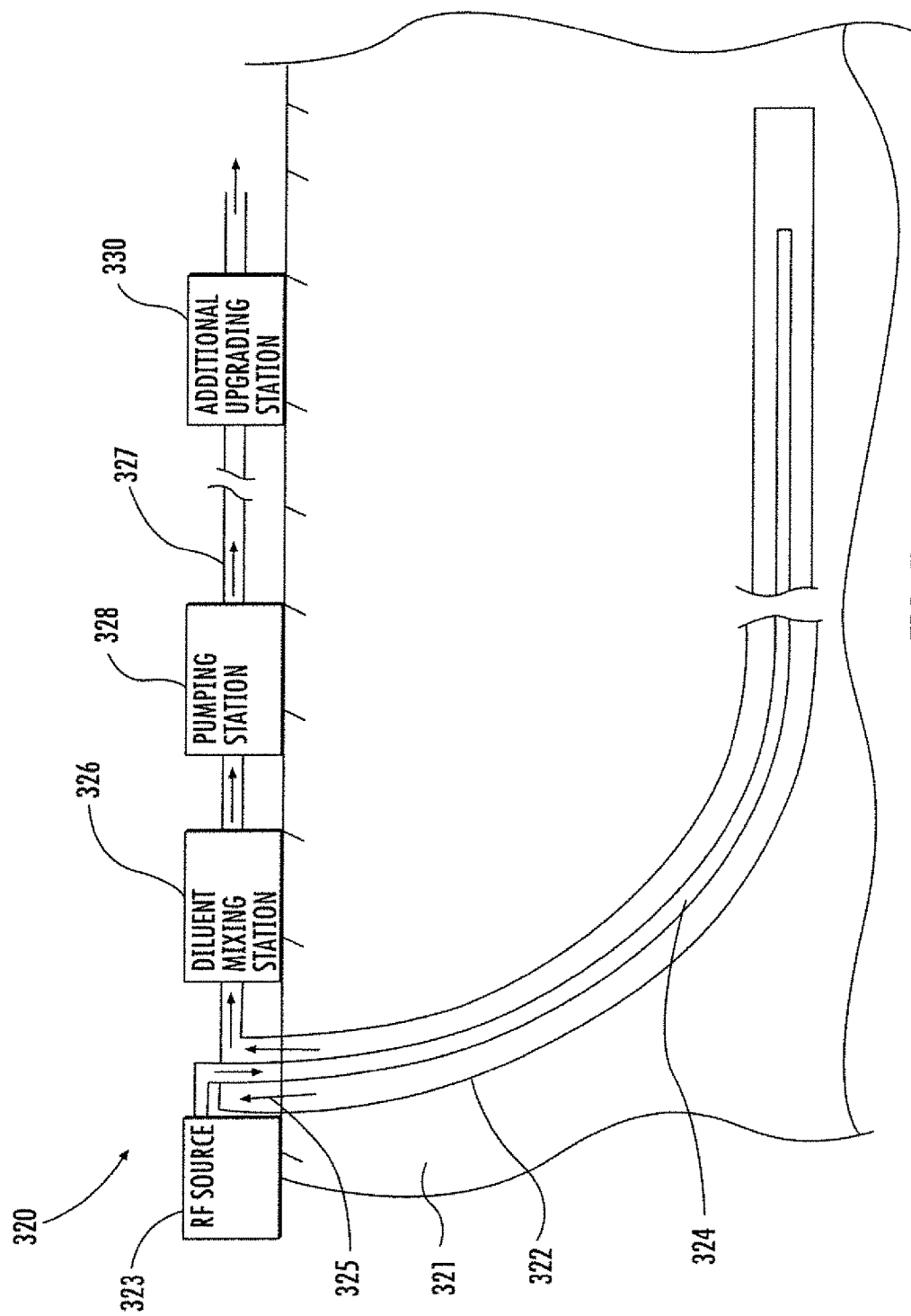
FIG. 7 is a schematic diagram of a subterranean formation including a system for recovering a hydrocarbon resource according to an embodiment of the present invention.
Figure 8:
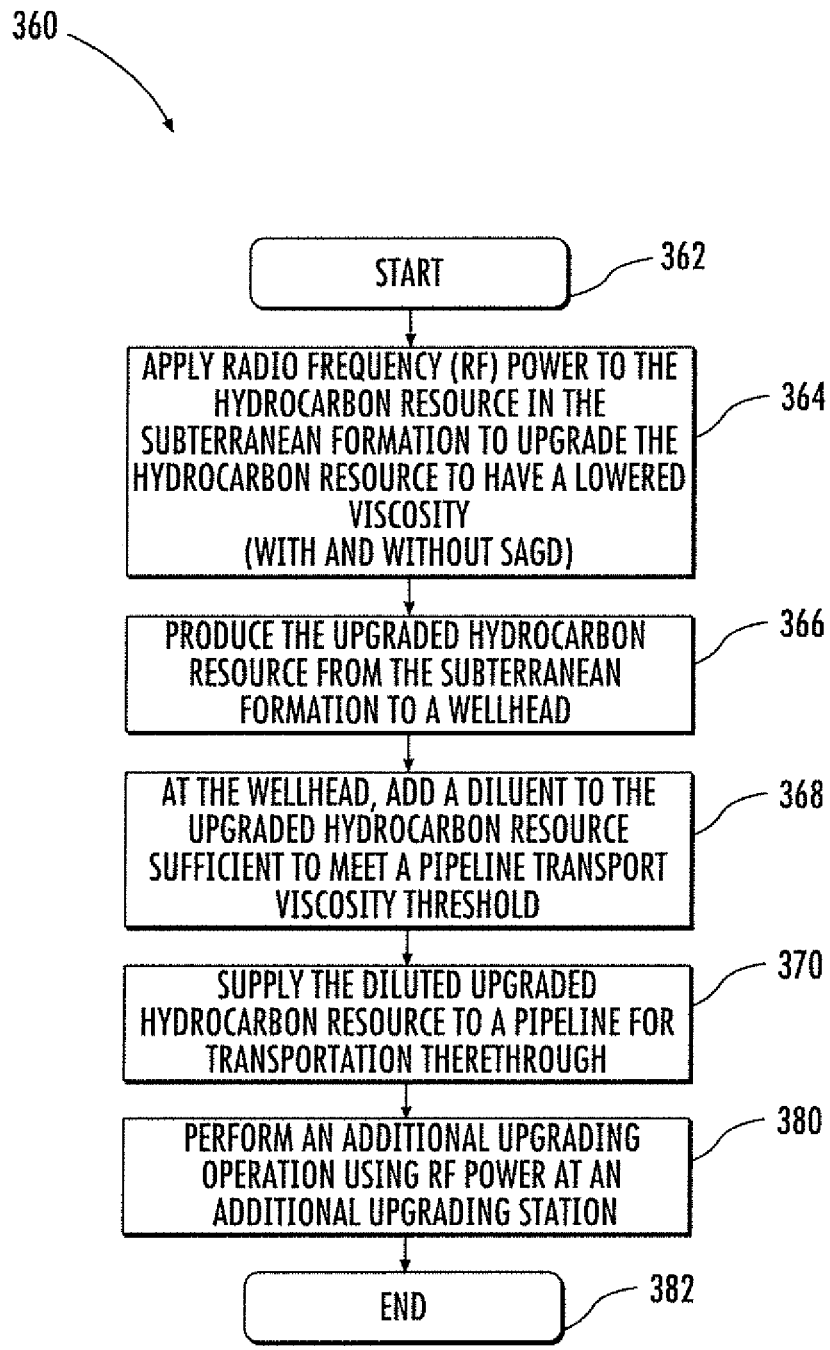
FIG. 8 is a flowchart of a method for recovering a hydrocarbon resource using the system of FIG. 7.

Referring now to FIG. 7 and the flowchart 360 in FIG. 8, another aspect is directed to a method for recovering a hydrocarbon resource, for example, bitumen, from a subterranean formation 321. A single wellbore 322 extends within the subterranean formation 321 defining a production well. Beginning at Block 362, the method includes applying radio frequency (RF) power to the hydrocarbon resource in the subterranean formation 321 to upgrade the hydrocarbon resource to have a lowered viscosity (Block 364). The RF power may be generated from an RF source 323 and applied to the hydrocarbon resource from an antenna 324 within the wellbore 322. The RF power is applied from the RF source 323 to the antenna 324 without steam-assisted gravity drainage (SAGD), which may be particularly advantageous for recovering a hydrocarbon resource using a single wellbore. The antenna 324 may be a coaxial-type antenna, a dipole antenna, or other type of antenna, for example. At Block 366, the method includes producing, from the production well 322, the upgraded hydrocarbon resource from the subterranean formation 321 to a wellhead 325.

The method further includes, at the wellhead 325, adding a diluent, from a diluent mixing station 326, to the upgraded hydrocarbon resource sufficient to meet a pipeline transport viscosity threshold (Block 368). As will be appreciated by those skilled in the art, the hydrocarbon resource typically meets a viscosity threshold prior to being transported, for example, from the production well 322 to downstream refineries or for further processing.

At Block 370, the method includes supplying the diluted upgraded hydrocarbon resource to a pipeline 327 for transportation therethrough. The diluted upgraded hydrocarbon resource is supplied to the pipeline 327 via a pumping station 328, which may be located at or adjacent the wellhead 325, for example.

At Block 380, the method includes optionally performing an additional upgrading operation using RF power at an additional upgrading station 330. The additional upgrading operation may be performed using the RF hydrocarbon upgrading apparatus 30 described above, and/or the apparatus for transporting and upgrading a hydrocarbon resource 220. It should be noted that more than one additional upgrading operation may be performed either alone or in combination. Moreover, the additional upgrading operations may be performed serially to further upgrade the hydrocarbon resource and/or in parallel to achieve a hydrocarbon resource having a desired characteristic, for example viscosity. The method ends at Block 382.

Figure 9:
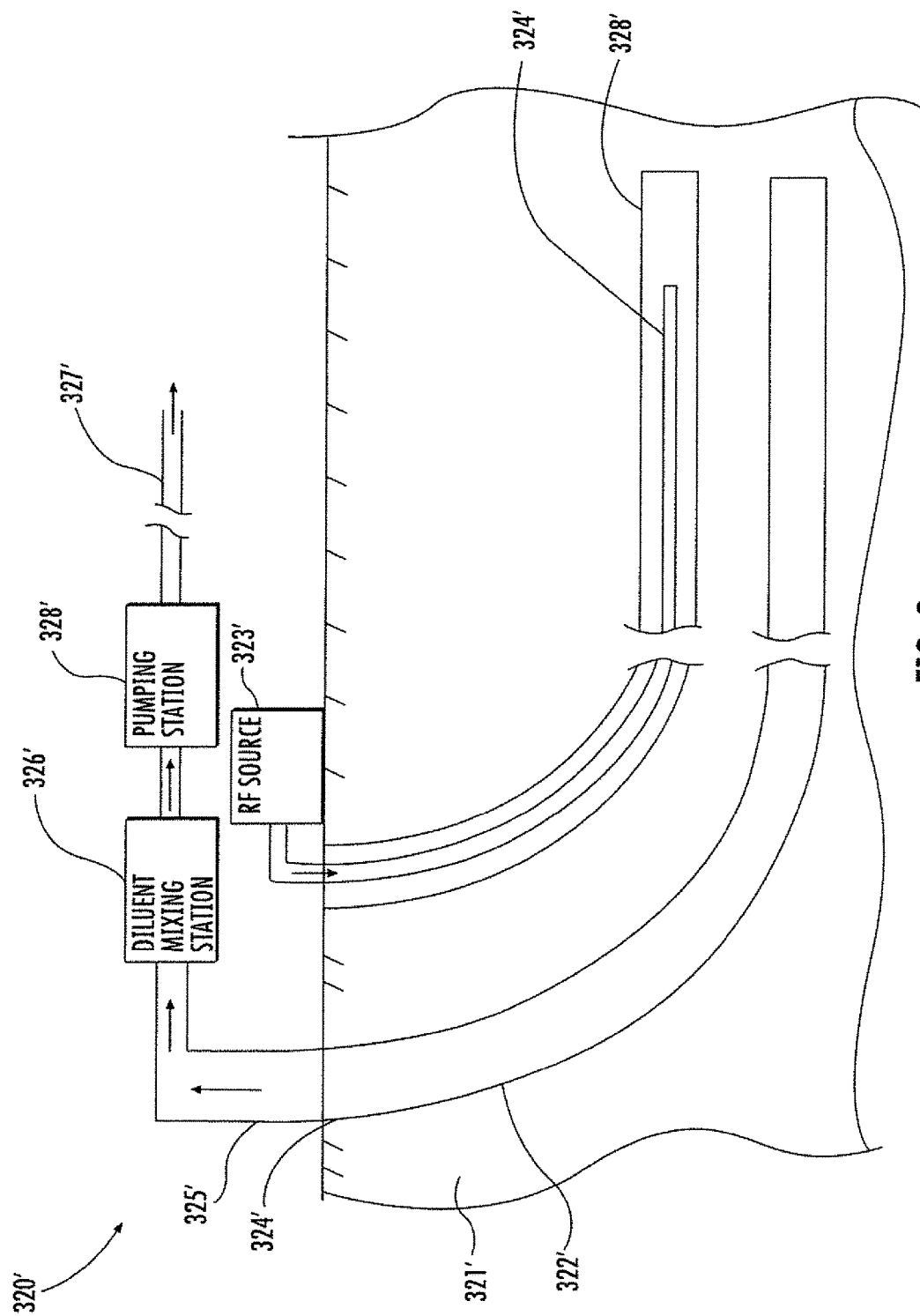
FIG. 9 is a schematic diagram of a subterranean formation including a system for recovering a hydrocarbon resource according to another embodiment of the present invention.

Referring now to the FIG. 9, in another embodiment the production wellbore 322' may extend laterally within the subterranean formation 321'. An injector wellbore 328' may be spaced apart from and extend laterally within the subterranean formation 321' adjacent the production wellbore 321'. The injector and production wellbores 322', 328' may define a pair of wellbores for use with the SAGO recovery technique. The antenna 324' is positioned within the injector wellbore 328'. More particularly, in this embodiment RF power is applied in combination with SAGD.

An system aspect is directed to a system 320 for recovering a hydrocarbon resource from a subterranean formation 321. The system includes a radio frequency (RF) antenna 324 configured to apply power to the hydrocarbon resource in the subterranean formation 321 to upgrade the hydrocarbon resource to have a lowered viscosity. The system 320 also includes a production well configured to produce the upgraded hydrocarbon resource from the subterranean formation 321 to a wellhead 325.

The system 320 also includes a diluent mixing station 326 at the wellhead 325 configured to add a diluent to the upgraded hydrocarbon resource sufficient to meet a pipeline transport viscosity threshold. The system 320 also includes a pumping station 328 configured to supply the diluted upgraded hydrocarbon resource to a pipeline 327 for transportation therethrough.

Figure 10:
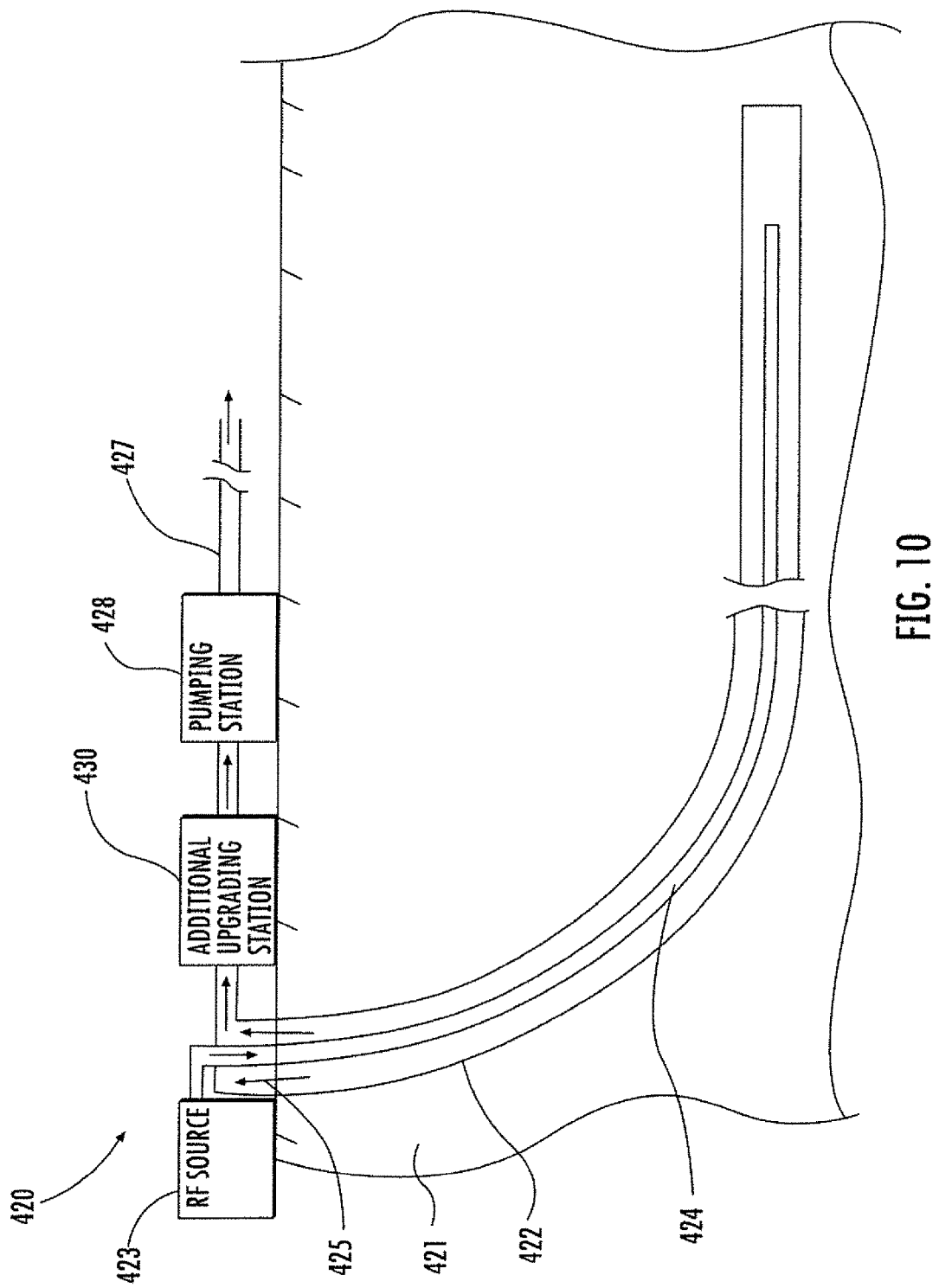
FIG. 10 is a schematic diagram of a subterranean formation including a system for recovering a hydrocarbon resource according to an embodiment of the present invention.
Figure 11:
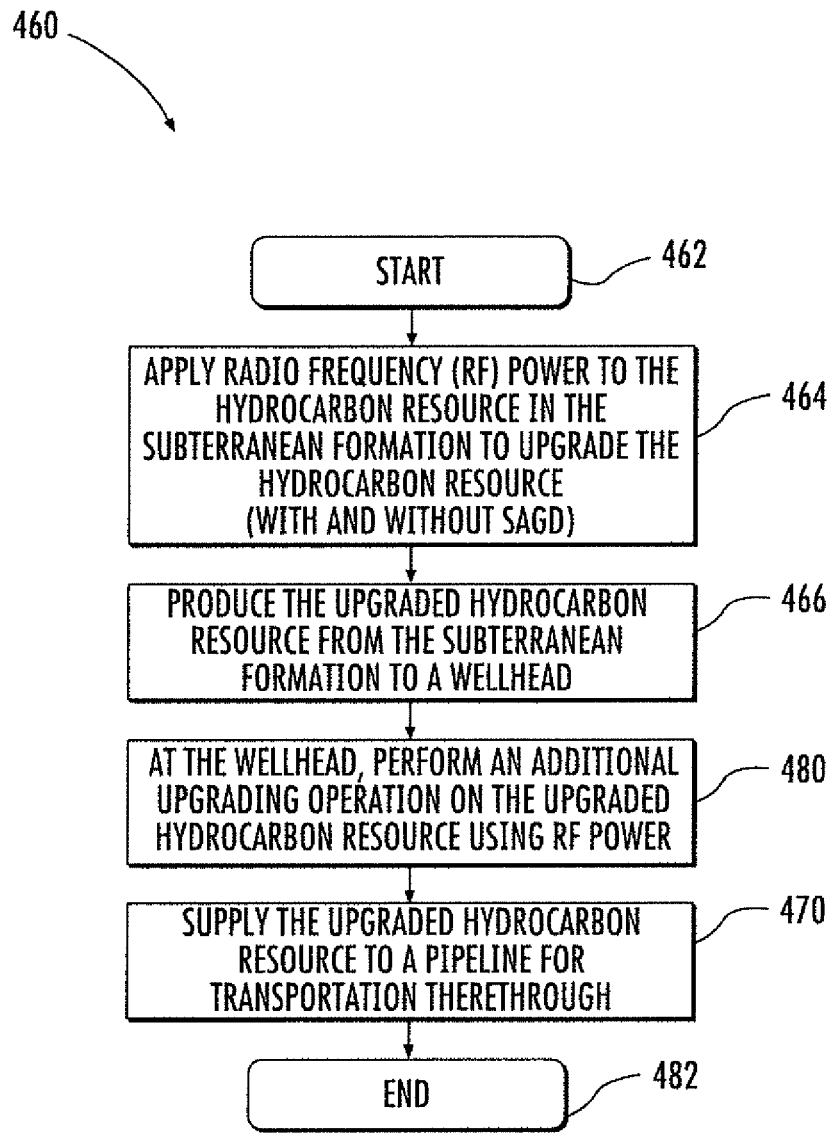
FIG. 11 is a flowchart of a method for recovering a hydrocarbon resource using the system of FIG. 10.
Figure 12:
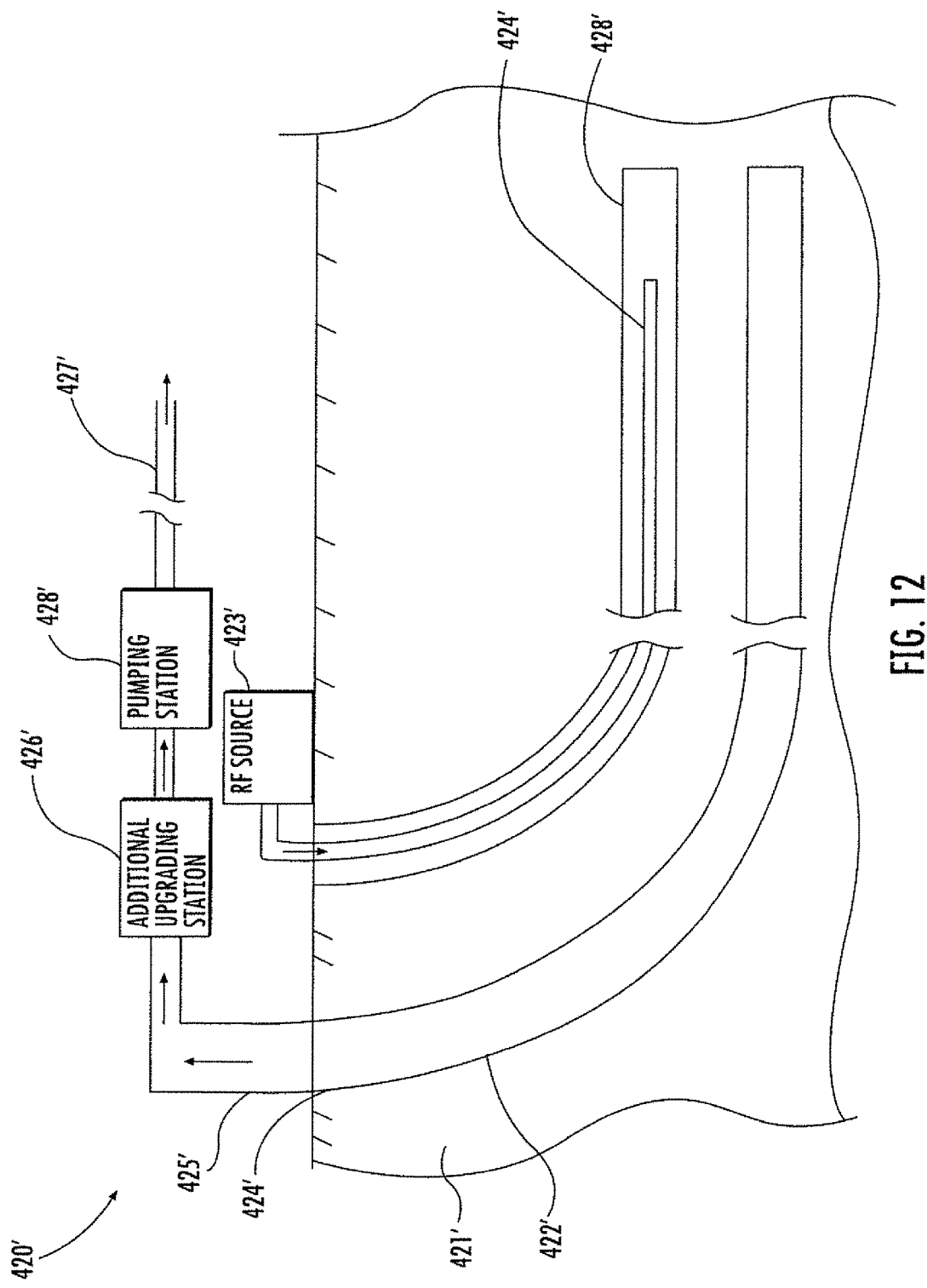
FIG. 12 is a schematic diagram of a subterranean formation including a system for recovering a hydrocarbon resource according to another embodiment of the present invention.

Referring now to FIG. 10 and the flowchart 460 in FIG. 11, another aspect is directed to a method for recovering a hydrocarbon resource, for example, bitumen, from a subterranean formation 421. A single wellbore 422 extends within the subterranean formation 421 defining a production well. Beginning at Block 462, the method includes applying radio frequency (RF) power to the hydrocarbon resource in the subterranean formation 421 to upgrade the hydrocarbon resource to have a lowered viscosity (Block 464). The RF power may be generated from an RF source 423 and applied to the hydrocarbon resource from an antenna 424 within the wellbore 422. The RF power is applied from the RF source 423 to the antenna 424 without steam-assisted gravity drainage (SAGD), which may be particularly advantageous for recovering a hydrocarbon resource using a single wellbore. The antenna 424 may be a coaxial-type antenna, a dipole antenna, or other type of antenna, for example. At Block 466, the method includes producing, from the production well 422, the upgraded hydrocarbon resource from the subterranean formation 421 to a wellhead 425.

At Block 480, the method includes, at the wellhead 425 performing an additional upgrading operation using RF power at an additional upgrading station 430. The additional upgrading operation may be performed using the RF hydrocarbon upgrading apparatus 30 described above, and/or the apparatus for transporting and upgrading a hydrocarbon resource 220. It should be noted that more than one additional upgrading operation may be performed either alone or in combination. Moreover, the additional upgrading operations may be performed serially to further upgrade the hydrocarbon resource and/or in parallel to achieve a hydrocarbon resource having a desired characteristic, for example viscosity.

At Block 470, the method includes supplying the upgraded hydrocarbon resource to a pipeline 427 for transportation therethrough. The upgraded hydrocarbon resource is supplied to the pipeline 427 via a pumping station 428, which is located downstream from the additional upgrading station 430, and may be at or adjacent the wellhead 425, for example. The method ends at Block 482.

Referring now to the FIG. 11, in another embodiment the production wellbore 422' may extend laterally within the subterranean formation 421'. An injector wellbore 428' may be spaced apart from and extend laterally within the subterranean formation 421' adjacent the production wellbore 421'. The injector and production wellbores 422', 428' may define a pair of wellbores for use with the SAGD recovery technique. The antenna 424' is positioned within the injector wellbore 428'. More particularly, in this embodiment RF power is applied in combination with SAGD.

A system aspect is directed to a system 420 for recovering a hydrocarbon resource from a subterranean formation 421. The system 420 includes a radio frequency (RF) antenna 424 configured to apply power to the hydrocarbon resource in the subterranean formation 421 to upgrade the hydrocarbon resource to have a lowered viscosity. The system 420 also includes a production well 422 configured to produce the upgraded hydrocarbon resource from the subterranean formation to a wellhead 425, and an additional upgrading station 430 using RF power to further upgrade the upgraded hydrocarbon resource at the wellhead. The system further includes a pumping station 428 downstream from the additional upgrading station 430 and configured to supply the upgraded hydrocarbon resource to a pipeline for transportation therethrough.

The methods, apparatuses, and systems described herein may be particularly advantageous for increasing hydrocarbon processing efficiency and, thus, reducing overall production costs. Without upgrading, for example, the production cost may be increased, and the duration of production may be increased or relatively long as is explained in further detail below.

Indeed, raw bitumen and/or heavy oil removed from the ground using both mining and in-situ processes may be too viscous for long distance pumping to refineries, for example. To transport raw bitumen and/or heavy oil requires heating or addition of diluents, such as, for example, Naphtha to create a "dilbit" (diluted bitumen). Any diluent is again extracted prior to refining/upgrading, which may reduce revenue.

More particularly, bitumen captured from producer wells is transported to holding tanks. Diluent is added to the bitumen to reduce viscosity creating a "dilbit" capable of transport at lower temperatures. The price of diluent fluctuates depending on type, market demand, and other factors, such as, for example, temperature. Pipeline tolls for diluent also exists further increasing costs. Diluent addition also reduces the net amount of bitumen being transported.

Upgrading processes (hydrocracking, coking, etc.) typically involve the use of relatively high temperatures, for example, in excess of 300° C. Each process is relatively expensive, having associated therewith a relatively large capital investment and operating costs, which may result in an increased price of the refined products.

Bitumen (like crude oil) is a complex mixture of chemicals with hydrocarbon chains in excess of 2,000 molecules, and it is thus desirable to upgrade the bitumen for added value. Upgrading, however, involves sorting the bitumen into its component parts for producing a range of additional products and by-products. Some products can be used "as is," while others may become raw materials for further processing. The main product of upgrading is synthesized crude oil that can be later refined similarly to conventional oil into a range of consumer products.

There are currently four industry standard methods for upgrading bitumen. One method is thermal conversion (coking). During the coking process, the bitumen is broken into lighter hydrocarbons (naphtha, kerosene, gas oils) using heat. Heat having temperatures of 500° C. (925° E) is applied over about a 12-hour period.

Another method of upgrading bitumen is catalytic conversion. In the catalytic conversion process, bead or pellet catalysts are mixed with the bitumen to enhance thermal conversion. Specific products in the bitumen are targeted with different catalyst materials. The catalytic conversion process has a higher cost than the coking process, but produces a higher grade product.

Yet another method of upgrading bitumen is distillation. In distillation, the bitumen in stored in a tower with a graded temperature profile along height (high temps at bottom of tower). Light products with low boiling points migrate to top of the tower as vapor, heavy, and more dense products collect at bottom of tower. Vapors condensing at various levels in the tower capture products, for example, kerosene and naphtha.

Still further, another method of upgrading bitumen is hydrotreating. Hydrotreating further refines the gas oils, kerosene, and naphtha produced from bitumen. A heated feedstock is mixed with hydrogen at high pressure and temperature (300-400° C.). The hydrotreating process also reduces or removes chemical impurities, such as, for example, nitrogen, sulfur, and trace metals.

It has been determined that bitumen may also be upgraded based upon the application of radio frequency (RF) energy at specific frequencies for a given duration. The application of RF for the given duration has been determined to have lasting effects on a hydrocarbon resource, for example, bitumen, in several ways. First, higher grade products may be extracted or distilled from bitumen processed at much lower temperatures than current methods, for example, the methods noted above (e.g. 150° C. vs.>300° C.). Resulting hydrocarbon resource based products are dependent on the processing frequency, which may allow for selective processing to obtain a specific product, for example. Second, a viscosity reduction of bitumen results in the ability to increase flow rates. The viscosity change is known to be lasting, rather than temporary, adding value to the bitumen.

To highlight the above effects on bitumen, a field test was performed using RF to upgrade the bitumen. The field test indicated a conversion of aromatics to polar molecules based upon RF power exposure to bitumen. The resulting RF exposed bitumen included indications of molecular decomposition including off gassing at lower than distillation minimum temperatures for bitumen (150° C. vs. 450° C. min) by the formation of a white "smoke", visual identification of light oils in/around the specimen holders (these dissipated over time), and reduced specimen viscosity (which disappeared over subsequent days). Further testing was performed to identify the reactions that were occurring at low frequencies.

Figure 13:
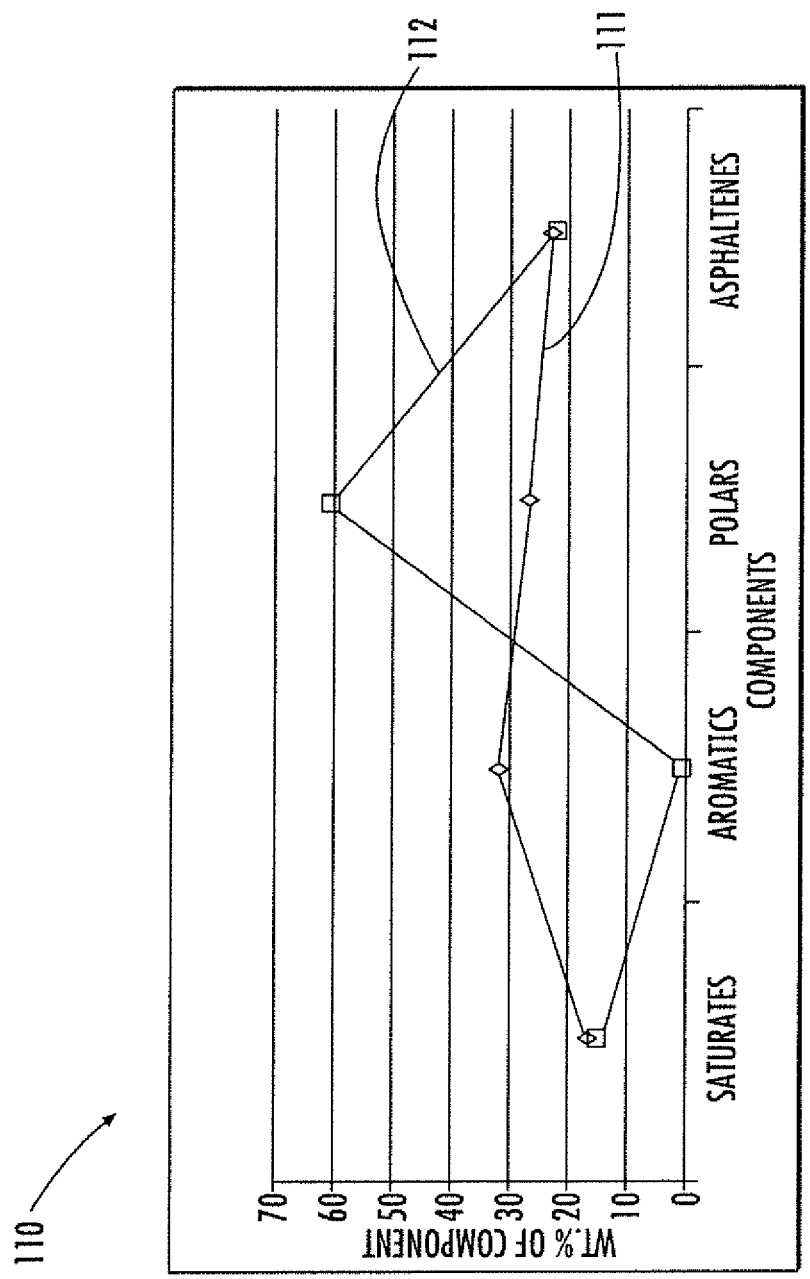
FIG. 13 is a graph of percent weight of components of a hydrocarbon resource processing using a test hydrocarbon resource processing apparatus.

A first heating test used a ring antenna to RF treat the bitumen. The uncontrolled first heating test included no nitrogen purge into the bitumen sample. The ring antenna was relatively difficult to tune and hold constant at 6.78 MHz. The resulting RF sample was analyzed, the result of which are illustrated below in Table 1 and in the corresponding graph 110 in FIG. 13. The line 111 illustrates the percent weight of a given component before RF treatment, while the line 112 illustrates the percent weight of a given component after RF treatment.

TABLE 1

|  | Before RF (wt. %) | After RF (wt. %) | % Change |
|---|---|---|---|
| Saturates | 17.23 | 15.3 | −12.61 |
| Aromatics | 32.27 | 0.96 | −3261.46 |
| Polars | 27.09 | 60.92 | 55.53 |
| Asphaltenes | 23.41 | 22.82 | −2.59 |

Indeed, the results indicate a significant change in aromatics and polar molecules after RF treatment.

Applicants theorize, without wishing to be bound thereto, that the change in aromatics and polar molecules is based on Hooke's law. Hooke's law of elasticity is an approximation that states that the extension of a spring is in direct proportion with the load applied to it. Mathematically, Hooke's law states that:

$$F = -kx$$

where x is the displacement of the spring's end from its equilibrium position (a distance, in SI units: meters), F is the restoring force exerted by the spring on that end (in SI units: N or kg·m/s$^2$), and k is a constant called the rate or spring constant (in SI units: N/m or kg/s$^2$).

As it pertains to chemical bonds, when an atom is displaced from its equilibrium position in a molecule, it is subject to a restoring force which increases with the displacement (i.e., Hooke's law). A chemical bond is therefore formally similar to a spring that has weights (atoms) attached to its two ends. A natural vibrational frequency which depends on the masses of the weights is initiated by the thermal energy of the surroundings.

Indeed, it can be theorized that a molecule holds its structure by seeking the lowest energy state, and energy is added by exposing bitumen to EM fields. The molecular structure resonates until a net energy reaches the failure threshold of a weak bond, whereby the failure results in cracking of large hydrocarbon chains.

Additional experiments were performed to test the above noted theory. First, constants and variables were established. It was known from the above-noted field test that a temperature of 150° C., a frequency of 27.8 MHz, for a time period of 1.5 hours produced white smoke and produced oil residue. The field test was also performed under a nitrogen blanket. It was noted improved results may have been achieved using a higher frequency, however, the frequency of the RF power applied was limited by regulations.

Next, the phenomena sensitivity to frequency was explored. This was performed by varying the frequency of the applied RF power and measuring the decomposition products. The frequencies tested were 13 MHz, 27.8 MHz, and 54 MHz.

The response at the exploration frequency was then explored. More particularly, the frequency band near the best performing frequency for a "best response" was explored.

Thereafter, the phenomena sensitivity to additives was explored. Hydrocarbon resources are commonly cracked at relatively high temperatures with water to supply the hydrogen for stabilizing the smaller broken-off molecules. Thus, the response of the samples (previously held inert by nitrogen) to the inclusion of water and hydrogen was investigated.

To further investigate and perform the additional experiments, a test hydrocarbon resource processing apparatus was developed. The test hydrocarbon resource processing apparatus was setup in an RF sealed chamber, which advantageously allowed for application of RF power at varying frequencies and power levels. A bitumen test chamber carried by a housing was set between first and second elongate antenna elements of an electric field antenna. The bitumen test chamber coupled to a Graham condenser, which was coupled to a water collection tank and cold water input and output ports.

The bitumen test chamber, which is sealed, includes a bitumen test cell, which may be polytetrafluoroethylene (PTFE) and have a capacity of about 100 grams. An output port is coupled at the bitumen test cell and also coupled to the Graham condenser. A pair of fiber optic temperature sensor ports are also coupled to the bitumen test cell. A nitrogen input line may also be coupled to the bitumen test cell. Threaded screws secured a top cover over the bitumen test cell.

Referring to Table 2 below, an overview of the tests performed using the test hydrocarbon resource processing apparatus are illustrated.

TABLE 2

| Samples | Frequency (MHz) | Temperature (° C.) | Duration | E/H Field | Analyses |
|---|---|---|---|---|---|
| Toluene | 27 MHz | N/A | N/A | N/A | Permittivity |
| Control Bitumen | — | — | — | — | FTIR, Sulfur, Viscosity |
| Control Bag | — | — | — | — | GC-MS |
| 077S-014 | 13 MHz | 150 | 1.5 hrs | E | FTIR, Sulfur, Viscosity, GC, GC-MS |
| 077S-015 | 27 MHz | 150 | 1.5 hrs | E | FTIR, Sulfur, Viscosity, GC, GC-MS |
| 077S-016 | 54 MHz | 150 | 1.5 hrs | E | FTIR, Sulfur, Viscosity, GC-MS |
| 077S-017 077S-018 077S-019 | 30 MHz | 150 | 30 min | E | FTIR, Sulfur, Viscosity, GC-MS (w/different purge gases) |

Figure 14:
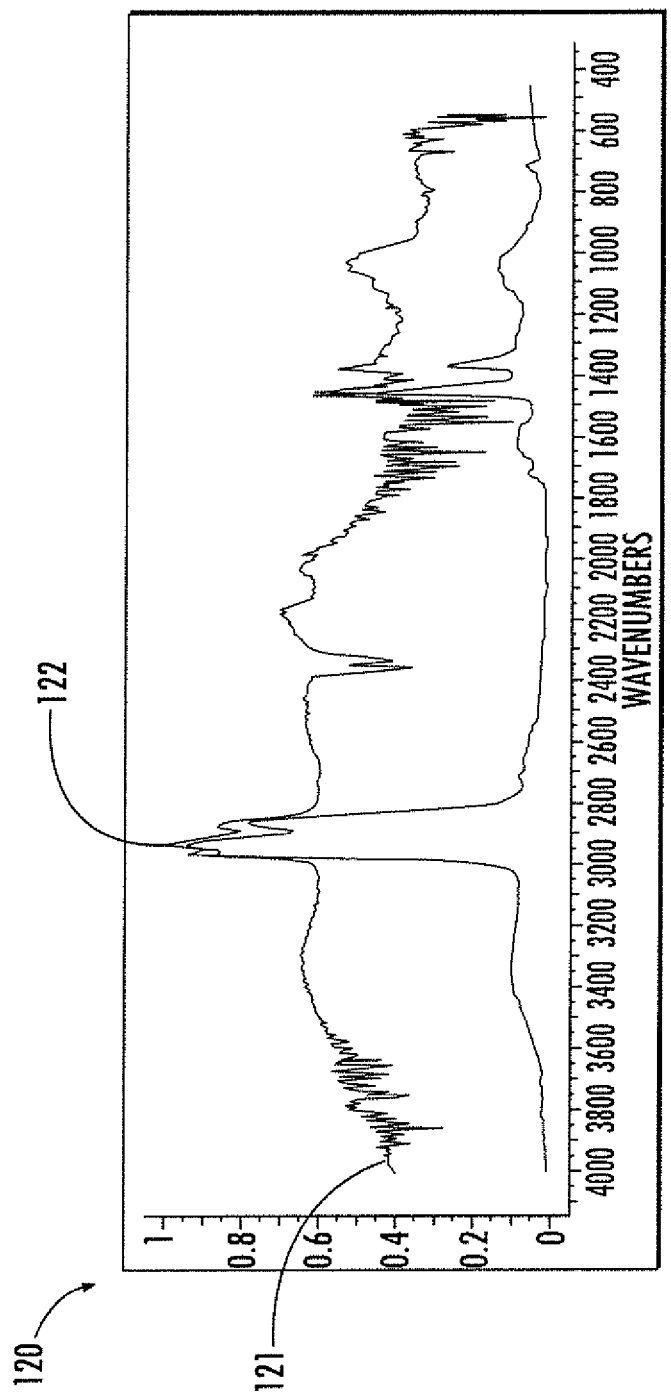
FIG. 14 is a graph of a Fourier transform infrared spectroscopy analysis of a bitumen sample upgraded using a test hydrocarbon resource processing apparatus and a commercially available refined hydrocarbon resource.

Referring now to the graph 120 in FIG. 14, a Fourier transform infrared spectroscopy analysis was performed on a bitumen sample heated using the test hydrocarbon resource processing apparatus. The analysis technique used was the "between salts" technique. The processed bitumen sample had a specific gravity of 0.872 at 25° C. The flash point of the processed bitumen sample was 400° F. and the pour point was −25° F. With respect to viscosity, the processed bitumen sample, had a viscosity of 207 Seybolt Universal Seconds (SUS). Chemically, the processed bitumen sample may be considered USP grade white oil.

Line 121 of the graph 120 corresponds to the processed bitumen sample, and line 122 corresponds to a sample of primol 205 available from Exxon Mobile Corporation of Irving, Tex. The analysis indicated a "dip" around wave number 2400, which may be attributed to $CO_2$ from the air, for example. Baseline noise was also indicated between wave numbers 1900 and about 1450. The processed bitumen sample may also have impurities, which are located at about wave number 1000.

Figure 15:
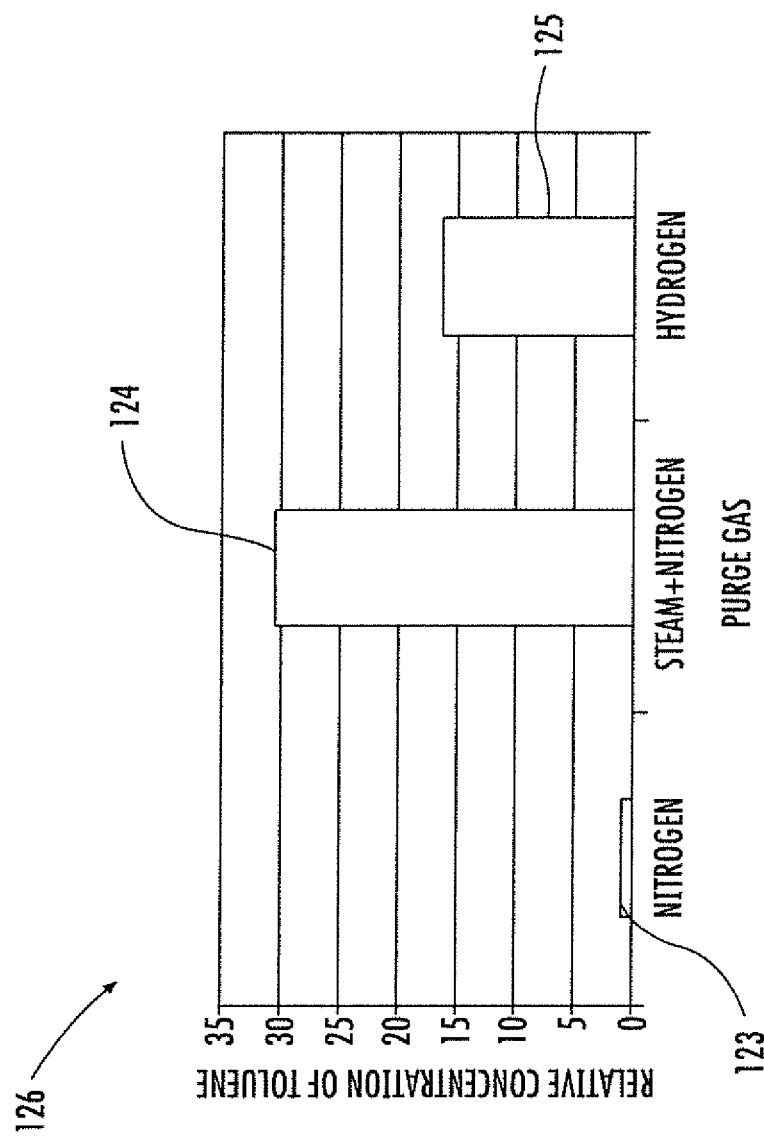
FIG. 15 is a graph of relative toluene concentration for different purge gasses using a test hydrocarbon resource upgrading apparatus.

The purpose of the analysis of the bitumen sample was to find evidence of cracked molecules. Based upon three purge gases (i.e., nitrogen ($N_2$), steam+$N_2$, and hydrogen), the steam+$N_2$ purge produced the most toluene. Toluene quantities recovered with the steam+$N_2$ purge were about two times more compared to $H_2$+$N_2$, and about sixteen times more compared to $N_2$. The relative concentration of toluene recovered with $N_2$ 123, steam+$N_2$ 124, and hydrogen 125 are illustrated in the graph 126 in FIG. 15. Indeed, evidence of cracked toluene occur based upon a hydrogen and steam+$N_2$ purges gases. More particularly, 3-methyl hexane and methyl cyclohexane were present.

Figure 16:
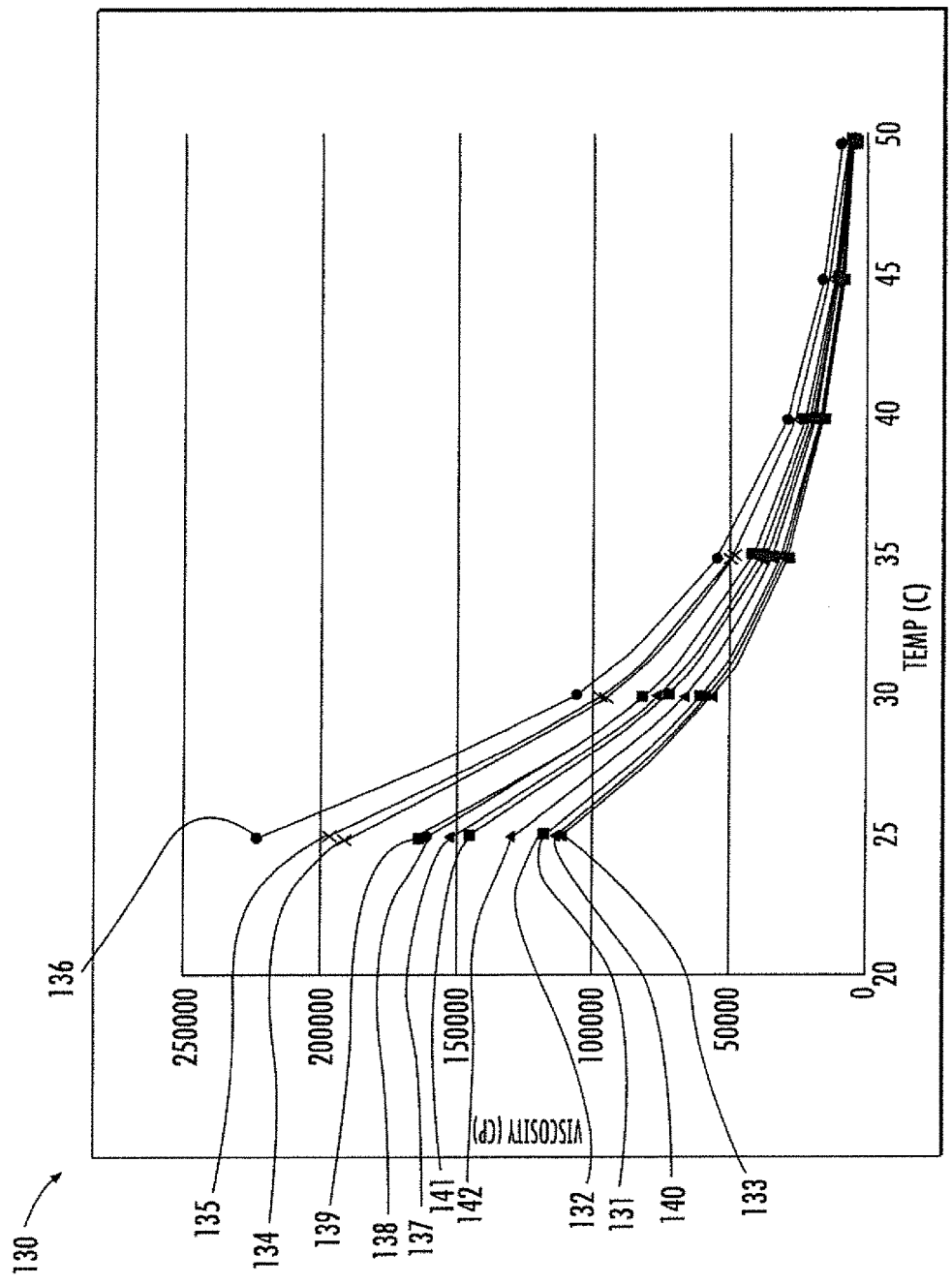
FIG. 16 is temperature versus viscosity graph for bitumen samples upgraded using a test hydrocarbon resource upgrading apparatus.

Referring now to the graph 130 in FIG. 16, viscosity tests for the bitumen sample processed using the test hydrocarbon resource processing apparatus are illustrated. Lines 131, 132, and 133 correspond to first, second, and third control tests. Lines 140, 141, and 142 correspond to first, second, and third tests using nitrogen ($N_2$) as a purge gas. Lines 134, 135, and 136 correspond to first, second, and third tests using hydrogen ($H_2$) as a purge gas. Lines 137, 138, and 139 correspond to first, second, and third tests using steam as a purge gas. It should be noted that the increased viscosity of the residual results in loss of thinning diluents from the bitumen sample.

Figure 17:
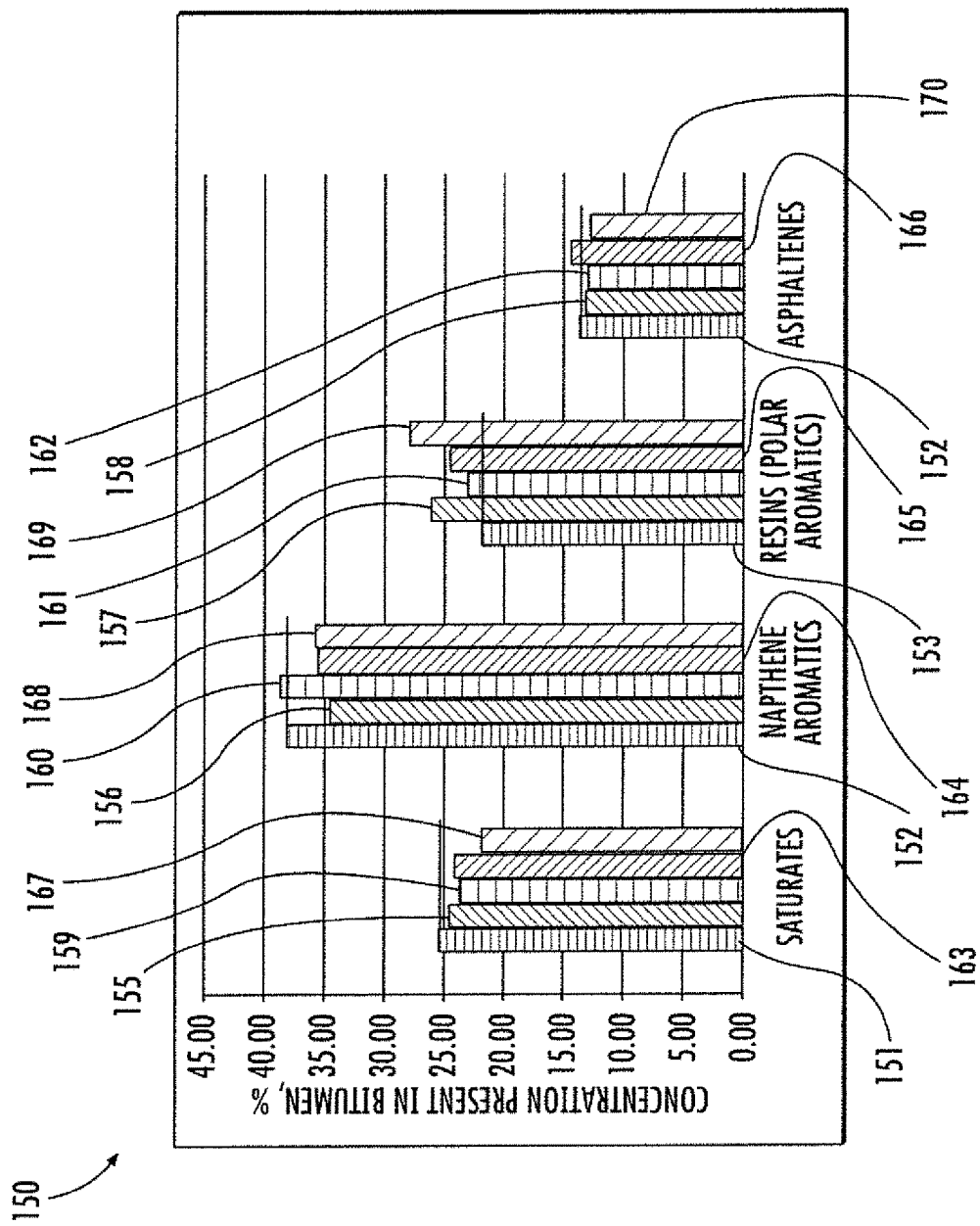
FIG. 17 is a graph of concentration of saturates, naphthalene aromatics, resins (polar aromatics), and asphaltines corresponding to different test and upgrading techniques using a test hydrocarbon resource upgrading apparatus.

Referring now to the graph 150 in FIG. 17, concentrations of saturates, naphthalene aromatics, resins (polar aromatics), and asphaltines, are illustrated. More particularly, the lines 151, 152, 153, and 154 correspond to a control test for each category (saturates, naphthalene aromatics, resins, and asphaltines), respectively, while the lines 155, 156, 157, and 158 correspond to an oven test for each category, respectively. Lines 159, 160, 161, and 162 correspond to tests using nitrogen as a purge gas, and lines 163, 164, 165, and 166 correspond to the tests using hydrogen as a purge gas for each respective category. Lines 167, 168, 169, and 170 correspond to steam injection as a purge gas for each category.

Illustratively, the steam purge sample had lowest saturates fraction, indicating steam selectively removes saturates from bitumen. The steam purge sample also had the largest change in napthene and resins combined.

Another test hydrocarbon resource processing apparatus was developed for use in further testing. Similar to the test hydrocarbon resource processing apparatus described above, the new test hydrocarbon resource processing apparatus was setup in an RF sealed chamber, which advantageously allowed for application of RF power at varying frequencies and power levels. The bitumen test chamber was similarly set between first and second elongate antenna elements of an electric field antenna.

The bitumen test chamber, which is sealed, included a bitumen test cell or bitumen cavity carried by housing. The bitumen test cell had a PTFE piston therein. A screw was removably coupled within a passageway of the piston for pressure relief. Threaded screws secured a top cover over the bitumen test cell. A nitrogen inlet, in the form of a compression fitting, for example, extends through the top and into the bitumen test cell. Seals, in the form of O-rings, are located between the top and the bitumen test cell. Seals, also in the form of O-rings, are also between the piston and the bitumen test cell. The test hydrocarbon resource processing apparatus also includes a temperature sensor port extending into the bitumen test cell.

Figure 18:
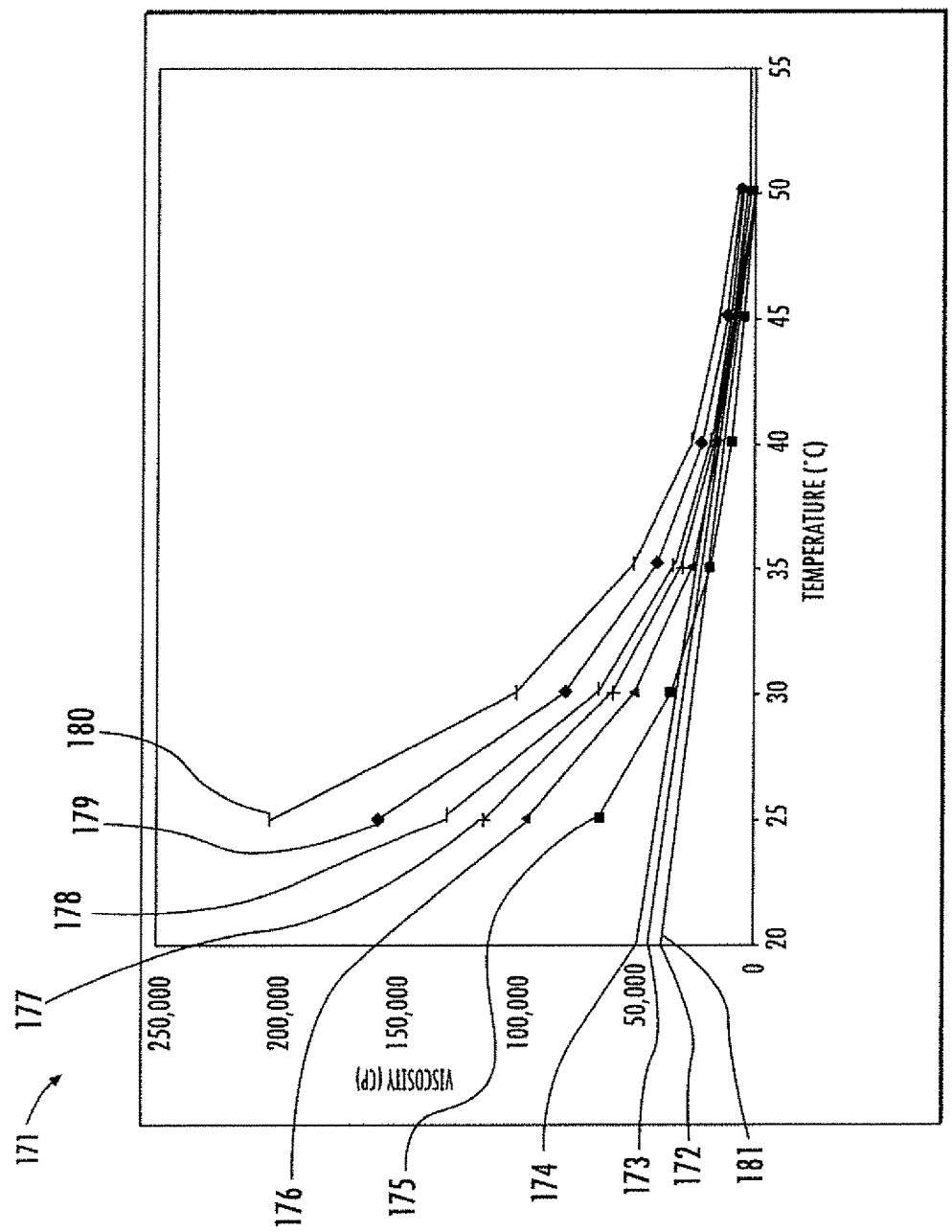
FIG. 18 is a graph of viscosity versus temperature for various upgraded bitumen samples taken from a mine face.

Referring now to the graph 171 in FIG. 18, viscosity versus temperature for various processed bitumen samples are illustrated. Lines 172, 173, 174, and 181 correspond to the viscosity of four different hydrocarbon resource samples, respectively, taken at a bitumen mine face. Lines 175 and 176 correspond to the average viscosity of a bitumen sample enclosed in the bitumen test cell for 30 minutes, and a bitumen sample enclosed in the bitumen test cell for 8 hours, respectively. Line 177 corresponds to the average viscosity for the control sample of bitumen, while line 178 corresponds to the average viscosity using nitrogen as the purge gas. Line 179 corresponds to the average viscosity using hydrogen as the purge gas. Line 180 corresponds to the average viscosity using steam as the purge gas. Viscosity decreases when lighter hydrocarbons are not removed.

Based upon the experiments conducted, it was determined that the change in off-gasses is dependent on the setup of and parameters used by a hydrocarbon resource processing system. Process Variables that affect output may include, for example, frequency, RF exposure time, process temperature, field strength, % of water in the hydrocarbon resource sample, the purge gas used, the type of system (open/closed), and the field type (electric (E) or magnetic (H)). Table 3 below illustrates the different test conditions and the gasses recovered.

TABLE 3

| Purge Gas | Frequency (MHz) | Temp (° C.) | Time (Hours) | Hydrocarbon Gases Produced |
|---|---|---|---|---|
| N2 | 6.78 | 150 | TBD | TBD |
| N2 | 13 | 150 | 0.5 | toluene |
| N2 | 27 | 150 | 0.5 (1.5) | toluene, styrene |
| N2 | 30 | 150 | 0.5 (1.5) | hexane, toluene, trimethy decane, trimethyl heptne, trimethyl dodecane |
| N2 | 54 | 150 | 0.5 (1.5) | toluene |
| Steam + N2 | 13 | 150 | 0.5 | TBD |
| Steam + N2 | 30 | 150 | 0.5 | cyclopentane, hexane, toluene, trimethy decane, ethylbenzene, xylene, ethyl trimethyl heptane, trimethyl dodecane |

TABLE 3-continued

| Purge Gas | Frequency (MHz) | Temp (° C.) | Time (Hours) | Hydrocarbon Gases Produced |
|---|---|---|---|---|
| H2 + N2 | 30 | 150 | | hexane, methyl hexane, methyl cyclohexane, toluene, trimethy decane, trimethyl heptanes, xylene, ethylbenzene, trimethyl dodecane |
| Oven | N/A | 150 | 0.5 (took 3 hours to get to temp) | hexane, toluene, diethyl cyclooctane, trimethyl nonene |

The data in Table 3 shows a real change in RF heated bitumen characteristics and that product recovery is dependent on the purge gas in an open system.

Indeed, a closed system was developed that affects bitumen with the following parameters: Frequency (30 MHz), E-field Type, Time (30 min), and Temperature (150° C.).

Figure 19:
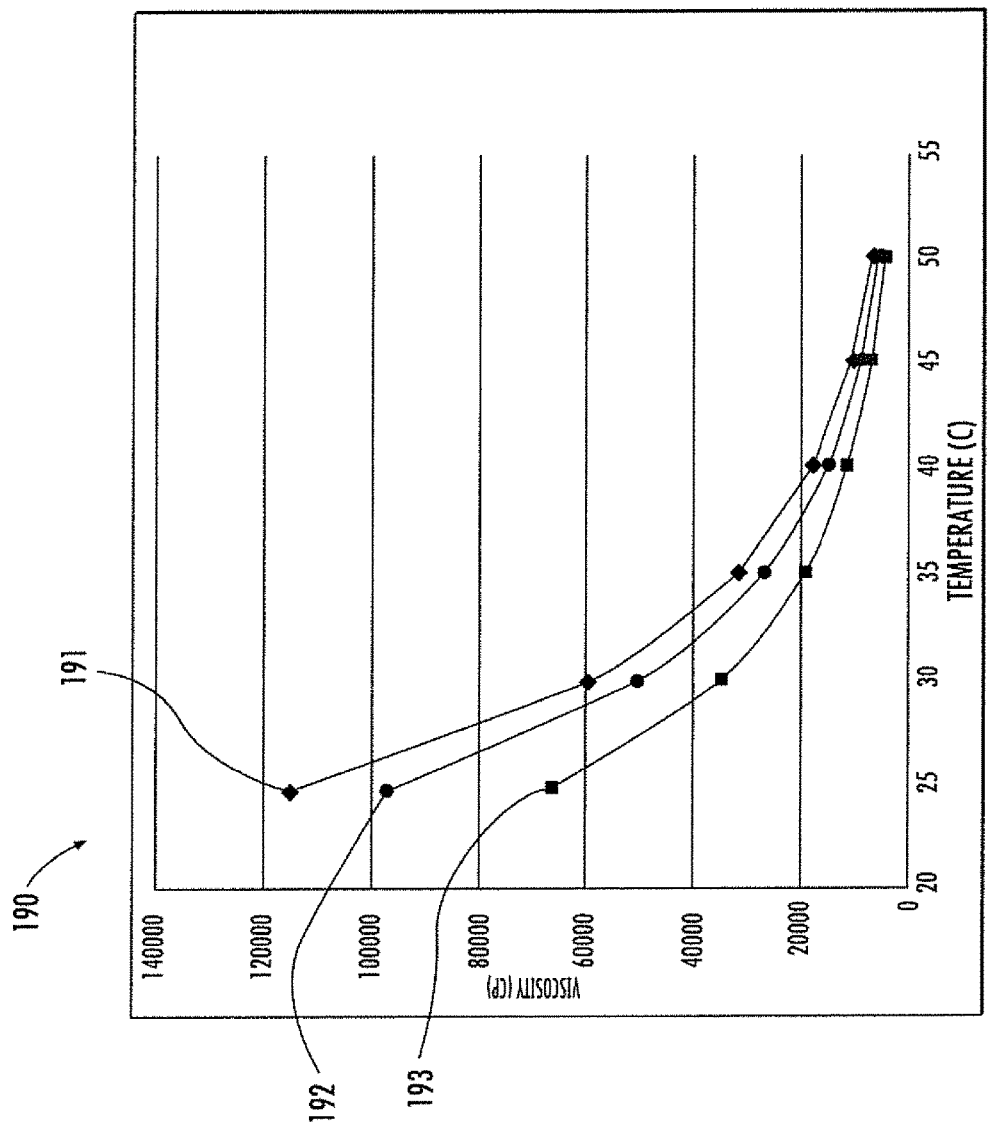
FIG. 19 is another graph of viscosity versus temperature for a bitumen control sample and bitumen samples upgraded using a test hydrocarbon resource processing apparatus.

As illustrated in the graph 190 in FIG. 19, the viscosity decreased substantially in closed system. Line 191 in the graph 190 corresponds to the average viscosity of a control sample of bitumen. Line 192 corresponds to the average viscosity for bitumen processed in the enclosed chamber for 30 minutes at 30 MHz, and line 193 corresponds to the viscosity of a bitumen sample processed in the enclosed chamber for 8 hours at 30 MHz. It is thus desirable to control the viscosity of the RF processed bitumen to a desired level.

Indeed, RF energy has been shown to provide upgrading characteristics such as dewatering and viscosity reduction of heavy oil and bitumen at much lower temperatures/energy input (<175° Celsius) than conventional hydrocarbon resource recovery processes. A lower temperature upgrading may correspond to a lower capital recovery cost, and thus, higher profits. Moreover, diluents needed to reduce viscosity for pipeline transport may be reduced or eliminated, which may mitigates the diluent cost itself, the processes of diluent addition for transport, and/or diluent removal prior to refining.

Additionally, upgrading with RF energy may take place in-line with the transport of heavy oil and bitumen via pipeline. This may be particularly advantageous since it allows for inline RF "upgraders" to be installed in existing plants with a reduced impact on downtime.

Further details and aspects of recovering and upgrading a hydrocarbon resource, for example, in a single wellbore, may be found in U.S. Patent Application Publication No. 2014/0014324, U.S. Patent Application Publication No. 2014/0014325, U.S. Patent Application Publication No. 2014/0014316 and U.S. Patent Application Publication No. 2014/0014326, all of which are assigned to the assignee of the present application, and the entire contents of all of which are herein incorporated by reference. Many modifications and other embodiments of the invention will come to the mind of one skilled in the art having the benefit of the teachings presented in the foregoing descriptions and the associated drawings. Therefore, it is understood that the That which is claimed is:

1. A radio frequency (RF) hydrocarbon resource treatment apparatus comprising:
a common input;
a first hydrocarbon resource treatment path coupled to the common input and comprising a plurality of first RF power applicator stages coupled in series, each first RF power stage comprising a storage tank having an input and an output and configured to apply RF power to treat a hydrocarbon resource and devoid of a catalyst; and
a second hydrocarbon resource treatment path coupled to the common input and comprising at least one second RF power applicator stage coupled in parallel with at least one of said first RF power applicator stages, said at least one second RF power applicator stage comprising a storage tank and being configured to apply RF power to treat a hydrocarbon resource and devoid of a catalyst;
said at least one second RF power applicator stage having an output coupled to an output of at least one of the plurality of first RF power applicator stages.

2. The hydrocarbon resource treatment apparatus of claim 1 wherein each successive one of said plurality of first RF power applicator stages reduces a viscosity of the hydrocarbon resource passing therethrough.

3. The hydrocarbon resource treatment apparatus of claim 1 wherein said at least one second RF power applicator stage reduces a viscosity of the hydrocarbon resource passing therethrough.

4. The hydrocarbon resource treatment apparatus of claim 1 wherein said common input is configured to receive bitumen.

5. The hydrocarbon resource treatment apparatus of claim 1 further comprising respective first and second outputs coupled to said first and second hydrocarbon resource treatment paths.

6. The hydrocarbon resource treatment apparatus of claim 1 wherein said plurality of first RF power applicator stages each has at least one different operating parameter than each other.

7. The hydrocarbon resource treatment apparatus of claim 1 wherein said at least one second RF power applicator stage has at least one different operating parameter than said plurality of first RF power applicator stages.

8. The hydrocarbon resource treatment apparatus of claim 1 wherein said first hydrocarbon resource treatment path comprises a plurality of first product taps associated with said plurality of first RF power stages.

9. The hydrocarbon resource treatment apparatus of claim 1 wherein said second hydrocarbon resource treatment path comprises a plurality of second product taps associated with said at least one second RF power stage.

10. A radio frequency (RF) hydrocarbon resource treatment apparatus comprising:
a common input;
a first hydrocarbon resource treatment path coupled to the common input and comprising a plurality of first RF power applicator stages coupled in series, each first RF power stage comprising a storage tank having an input and an output and configured to apply RF power to treat a hydrocarbon resource and devoid of a catalyst; and
a second hydrocarbon resource treatment path coupled to the common input and comprising at least one second RF power applicator stage coupled in parallel with at least one of said first RF power applicator stages, said at least one second RF power applicator stage comprising a storage tank and being configured to apply RF power to treat a hydrocarbon resource and devoid of a catalyst; and
first and second outputs coupled to said first and second hydrocarbon resource treatment paths, respectively;
said at least one second RF power applicator stage having an output coupled to an output of at least one of the plurality of first RF power applicator stages.

11. The hydrocarbon resource treatment apparatus of claim 10 wherein each successive one of said plurality of first RF power applicator stages reduces a viscosity of the hydrocarbon resource passing therethrough.

12. The hydrocarbon resource treatment apparatus of claim 10 wherein said at least one second RF power applicator stage reduces a viscosity of the hydrocarbon resource passing therethrough.

13. The hydrocarbon resource treatment apparatus of claim 10 wherein said common input is configured to receive bitumen.

14. The hydrocarbon resource treatment apparatus of claim 10 wherein said plurality of first RF power applicator stages each has at least one different operating parameter than each other.

15. The hydrocarbon resource treatment apparatus of claim 10 wherein said at least one second RF power applicator stage has at least one different operating parameter than said plurality of first RF power applicator stages.

16. The hydrocarbon resource treatment apparatus of claim 10 wherein said first hydrocarbon resource treatment path comprises a plurality of first product taps associated with said plurality of first RF power stages.

17. A radio frequency (RF) treatment method for a hydrocarbon resource comprising:
passing a portion of the hydrocarbon resource through a first hydrocarbon resource treatment path coupled to a common input and comprising a plurality of first RF power applicator stages coupled in series, each first RF power stage comprising a storage tank having an input and an output and applying RF power to treat the hydrocarbon resource therein and devoid of a catalyst; and
passing another portion of the hydrocarbon resource through a second hydrocarbon resource treatment path coupled to the common input and comprising at least one second RF power applicator stage coupled in parallel with at least one of the first RF power applicator stages, the at least one second RE power applicator stage comprising a storage tank and applying RF power to treat a hydrocarbon resource therein and devoid of a catalyst, the at least one second RF power applicator stage having an output coupled to an output of at least one of the plurality of first RF power applicator stages.

18. The method of claim 17 wherein each successive one of the plurality of first RE power applicator stages reduces a viscosity of the hydrocarbon resource passing therethrough.

19. The method of claim 17 wherein the at least one second RF power applicator stage reduces a viscosity of the hydrocarbon resource passing therethrough.

20. The method of claim 17 further comprising receiving bitumen at a common input coupled to the first and second hydrocarbon resource upgrading paths.

21. The method of claim 17 further comprising passing the hydrocarbon resource through respective first and second outputs coupled to the first and second hydrocarbon resource upgrading paths.

* * * * *